(12) United States Patent
Hosokawa

(10) Patent No.: US 10,999,490 B2
(45) Date of Patent: May 4, 2021

(54) IMAGING CONTROL DEVICE AND IMAGING CONTROL METHOD

(71) Applicant: Sony Corporation, Tokyo (JP)

(72) Inventor: Takayuki Hosokawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/303,564

(22) PCT Filed: Aug. 24, 2017

(86) PCT No.: PCT/JP2017/030360
§ 371 (c)(1),
(2) Date: Nov. 20, 2018

(87) PCT Pub. No.: WO2018/047632
PCT Pub. Date: Mar. 15, 2018

(65) Prior Publication Data
US 2020/0154057 A1    May 14, 2020

(30) Foreign Application Priority Data
Sep. 7, 2016   (JP) .............................. JP2016-174514

(51) Int. Cl.
*H04N 5/232* (2006.01)
*G02B 7/36* (2021.01)

(52) U.S. Cl.
CPC ......... *H04N 5/232122* (2018.08); *G02B 7/36* (2013.01)

(58) Field of Classification Search
CPC ............................ H04N 5/232122; G02B 7/36
See application file for complete search history.

(56) References Cited

U.S. PATENT DOCUMENTS

| 2007/0206940 A1* | 9/2007 | Kusaka ................. G03B 13/28 396/128 |
| 2011/0267532 A1* | 11/2011 | Sakurai ............. H04N 5/23212 348/345 |
| 2014/0071318 A1 | 3/2014 | Akamatsu et al. |
| 2014/0218595 A1 | 8/2014 | Kanda |

(Continued)

FOREIGN PATENT DOCUMENTS

| JP | 2007233034 A | 9/2007 |
| JP | 2015087705 A | 5/2015 |
| WO | 2013/164937 A1 | 11/2013 |

OTHER PUBLICATIONS

Japanese Office Action dated Sep. 15, 2020 for corresponding Japanese Application No. 2016-174514.

*Primary Examiner* — Mekonnen D Dagnew
(74) *Attorney, Agent, or Firm* — Michael Best & Friedrich LLP

(57) ABSTRACT

The present disclosure includes an imaging control device, an imaging control method, and an imaging apparatus. The imaging control device includes a focus detection control circuitry configured to determine whether a setting area includes a portion of a dedicated phase difference detection sensor, the setting area being in a photographing range of an imaging unit. The focus detection control circuitry is further configured to set one or more ranging areas of an image plane phase difference detection sensor to one or more first ranging areas in response to determining that the setting area does not include the portion of the dedicated phase difference detection sensor.

20 Claims, 17 Drawing Sheets

(56) References Cited

U.S. PATENT DOCUMENTS

2015/0055011 A1    2/2015  Aoki
2019/0268545 A1*   8/2019  Inomata ........... H04N 5/232123
2020/0296295 A1*   9/2020  Ugawa ................ H04N 9/0455

* cited by examiner

FIG. 3

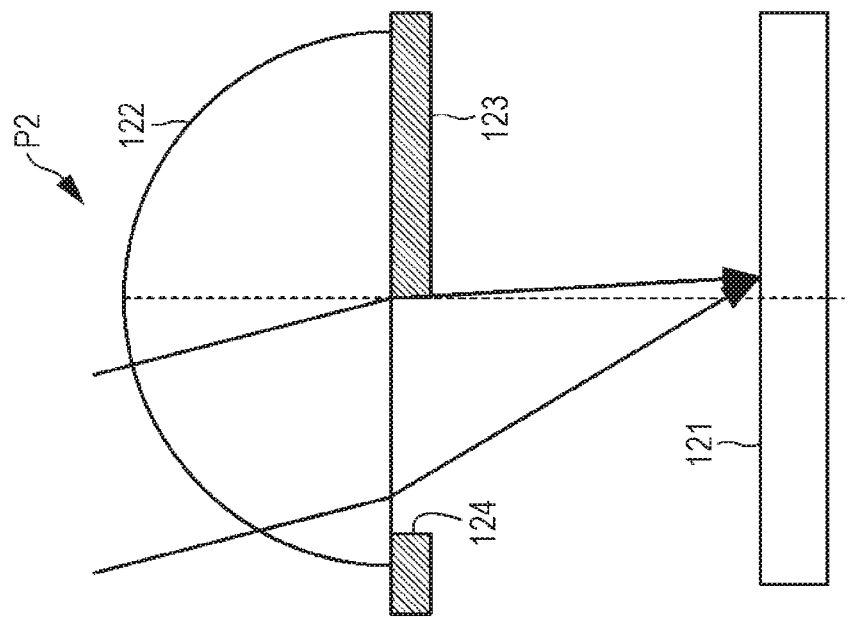
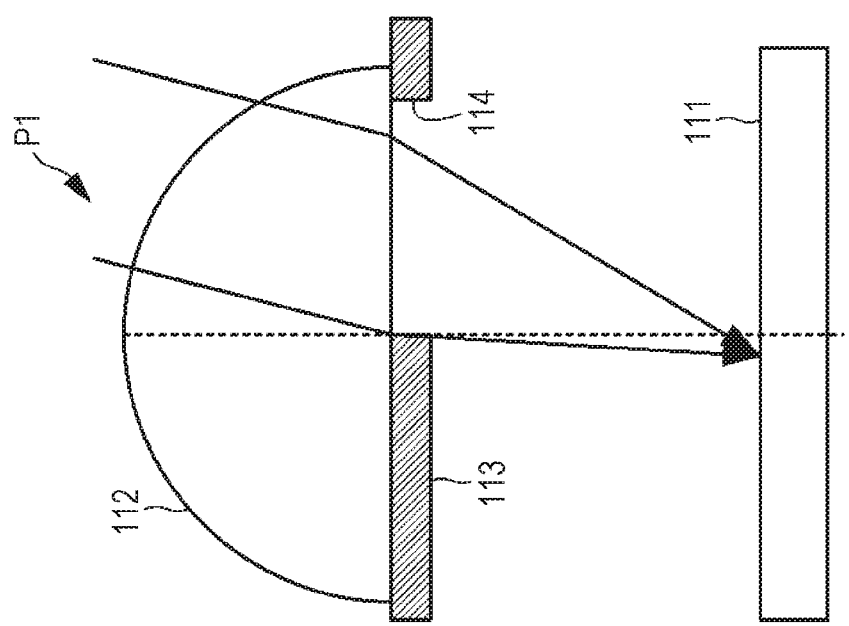

IMAGING CONTROL DEVICE AND IMAGING CONTROL METHOD

CROSS REFERENCE TO RELATED APPLICATIONS

This application claims the benefit of Japanese Priority Patent Application JP 2016-174514 filed on Sep. 7, 2016, the entire contents of which are incorporated herein by reference.

TECHNICAL FIELD

The present disclosure relates to an imaging control device and an imaging control method.

BACKGROUND ART

Proposed in the related art are various systems for automatically detecting a focal point (auto-focus systems). For example, PTL 1 below describes an imaging device that carries out focusing by employing a focus detector including a dedicated sensor and a focus detector using a part of pixels included in an imaging element while selectively switching therebetween.

CITATION LIST

Patent Literature

[PTL 1] JP 2007-233034 A

SUMMARY

Technical Problem

In this type of field, there is a need for improvement in auto-focus accuracy.

It is desirable to provide an imaging control device and an imaging control method capable of improving auto-focus accuracy.

Solution to Problem

According to an embodiment of the present disclosure, there is provided an imaging control device comprising a focus detection control circuitry configured to determine whether a setting area includes a portion of a dedicated phase difference detection sensor, the setting area being in a photographing range of an imaging unit. The focus detection control circuitry is further configured to set one or more ranging areas of an image plane phase difference detection sensor to one or more first ranging areas in response to determining that the setting area does not include the portion of the dedicated phase difference detection sensor.

According to another embodiment of the present disclosure, there is provided an imaging control method. The method includes determining whether a setting area includes a portion of a dedicated phase difference detection sensor, the setting area being in a photographing range of an imaging unit. The method also includes setting, with a focus detection control circuitry, one or more ranging areas of an image plane phase difference detection sensor to one or more first ranging areas in response to determining that the setting area does not include the portion of the dedicated phase difference detection sensor.

According to yet another embodiment of the present disclosure, there is provided an imaging apparatus. The imaging apparatus includes a dedicated phase difference detection sensor, an image plane phase difference detection sensor, and a focus detection control circuitry. The focus detection control circuitry is configured to determine whether a setting area includes a portion of the dedicated phase difference detection sensor, the setting area being in a photographing range of an imaging unit. The focus detection control is further configured to set one or more ranging areas of the image plane phase difference detection sensor to one or more first ranging areas in response to determining that the setting area does not include the portion of the dedicated phase difference detection sensor.

Advantageous Effects of Invention

According to at least a first embodiment of the present disclosure, it is possible to improve auto-focus accuracy. However, the effect described here is not necessarily limited, and any effect described in the present disclosure may be acceptable. Furthermore, details of the present disclosure are not limited and interpreted by the exemplified effects.

BRIEF DESCRIPTION OF DRAWINGS

FIG. 3 describes an exemplary arrangement of phase difference detection pixels.

FIGS. 4A and 4B are views for describing an exemplary configuration of a pair of phase difference detection pixels.

DESCRIPTION OF EMBODIMENTS

An embodiment and the like of the present disclosure will be described below with reference to the drawings. Note that descriptions will be given in an order below.

<1. First Embodiment>
<2. Modification>

The embodiment and the like described below are preferred specific examples of the present disclosure, and details of the present disclosure are not limited thereto.

1. First Embodiment

[Exemplary Configuration of Imaging Device]

Figure 1:
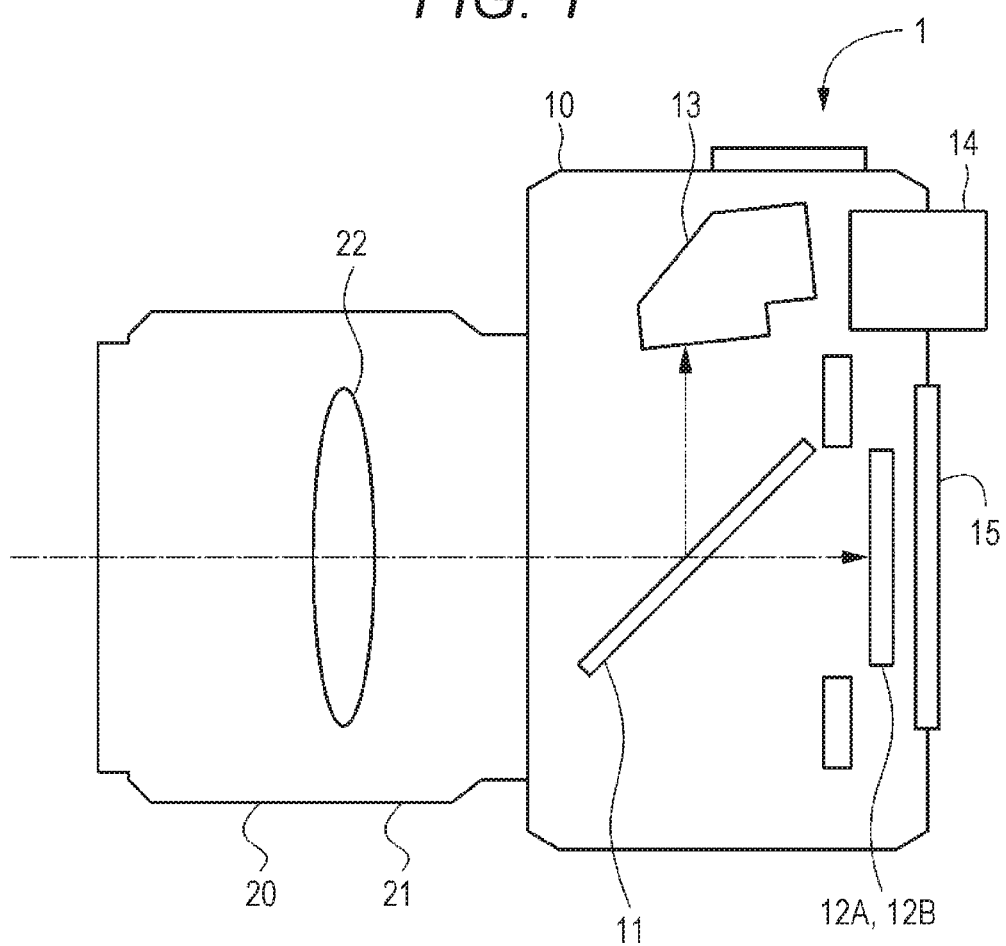
FIG. 1 is a sectional pattern view illustrating a schematic configuration of an imaging device according to a first embodiment of the present disclosure.

Firstly, an exemplary configuration of an imaging device according to a first embodiment of the present disclosure will be described. FIG. 1 is a sectional pattern view illustrating a schematic configuration of an imaging device 1 according to the first embodiment of the present disclosure.

The imaging device 1 includes a body 10, an optical imaging system 20 with a photographing lens 22, a semi-transmissive mirror 11, an imaging element 12A, an image plane auto-focus (AF) sensor 12B (e.g., an image plane phase difference detection sensor), a dedicated phase difference AF sensor 13 (e.g., a dedicated phase difference detection sensor), an electronic view finder 14, and a display 15. For example, an imaging unit includes the imaging element 12A and the optical imaging system 20.

As illustrated in FIG. 1, the optical imaging system 20 is provided to the body 10. The optical imaging system 20 is, for example, a so-called replaceable lens unit and provided with, for example, the photographing lens 22 and a diaphragm in a lens barrel 21. The photographing lens 22 is driven by a focus drive system (not illustrated) and capable of AF operation. Meanwhile, the optical imaging system 20 may be integrated with the body 10, or may be attachable to and detachable from the body 10 via a predetermined adapter.

The semi-transmissive mirror 11 is provided in the body 10 between the photographing lens 22 and the imaging element 12A in the body 10. Object light enters the semi-transmissive mirror 11 through the photographing lens 22. The semi-transmissive mirror 11 reflects part of object light that enters through the photographing lens 22 in a direction of the upper dedicated phase difference AF sensor 13 and transmits part of the object light to the imaging element 12A. Meanwhile, it is possible to arbitrarily set, for example, transmittance and reflectance of the semi-transmissive mirror 11. In addition, the semi-transmissive mirror 11 may be fixed or movable.

The body 10 is provided with the imaging element 12A for generating a photographed image. As the imaging element 12A, for example, a charge coupled device (CCD) and a complementary metal oxide semiconductor (CMOS) are used. The imaging element 12A photoelectrically converts object light that enters through the photographing lens 22 into a charge amount to generate an image. An image signal is subjected to predetermined signal processing such as white balance adjustment processing and gamma correction processing to be eventually stored as image data in, for example, a storage medium in the imaging device 1, an external memory, and a portable memory attachable to and detachable from the imaging device 1.

The imaging element 12A has, for example, red (R), green (G), and blue (B) pixels which are normal imaging pixels, as well as the image plane AF sensor 12B that carries out phase difference focus detection. Each pixel included in an imaging element photoelectrically converts incident light from an object into a charge amount to output a pixel signal.

The dedicated phase difference AF sensor 13 is provided to be positioned, for example, above the semi-transmissive mirror 11 and in front of the imaging element 12A in the body 10. The dedicated phase difference AF sensor 13 is, for example, a module exclusively for auto-focusing in a phase difference detection system. Object light collected by the photographing lens 22 enters the dedicated phase difference AF sensor 13 by being reflected by the semi-transmissive mirror 11. A focus detection signal detected by the dedicated phase difference AF sensor 13 is supplied to, for example, a processing unit that calculates a defocus amount in the imaging device 1.

The body 10 is provided with the electronic view finder (EVF) 14. The electronic view finder 14 includes, for example, a liquid crystal display (LCD) and an organic electroluminescence (EL) display. The electronic view finder 14 is supplied with image data obtained by processing an image signal extracted from the imaging element 12A in a signal processing unit (not illustrated), and displays the image data as real-time images (through images).

The body 10 is provided with the display 15. The display 15 is, for example, a flat display such as a liquid crystal display and an organic EL display. The display 15 is supplied with image data obtained by processing an image signal extracted from the imaging element 12A in the signal processing unit (not illustrated), and displays the image data as real-time images (so-called through images). In FIG. 1, the display 15 is provided on, but not limited to, a back side of the body, and may be provided on, for example, an upper surface of the body or may be movable or removable. The display 15 may not be provided to the body 10. In this case, for example, a television device connected to the imaging device 1 may function as the display 15.

[Exemplary Internal Configuration of Imaging Device]

Figure 2:
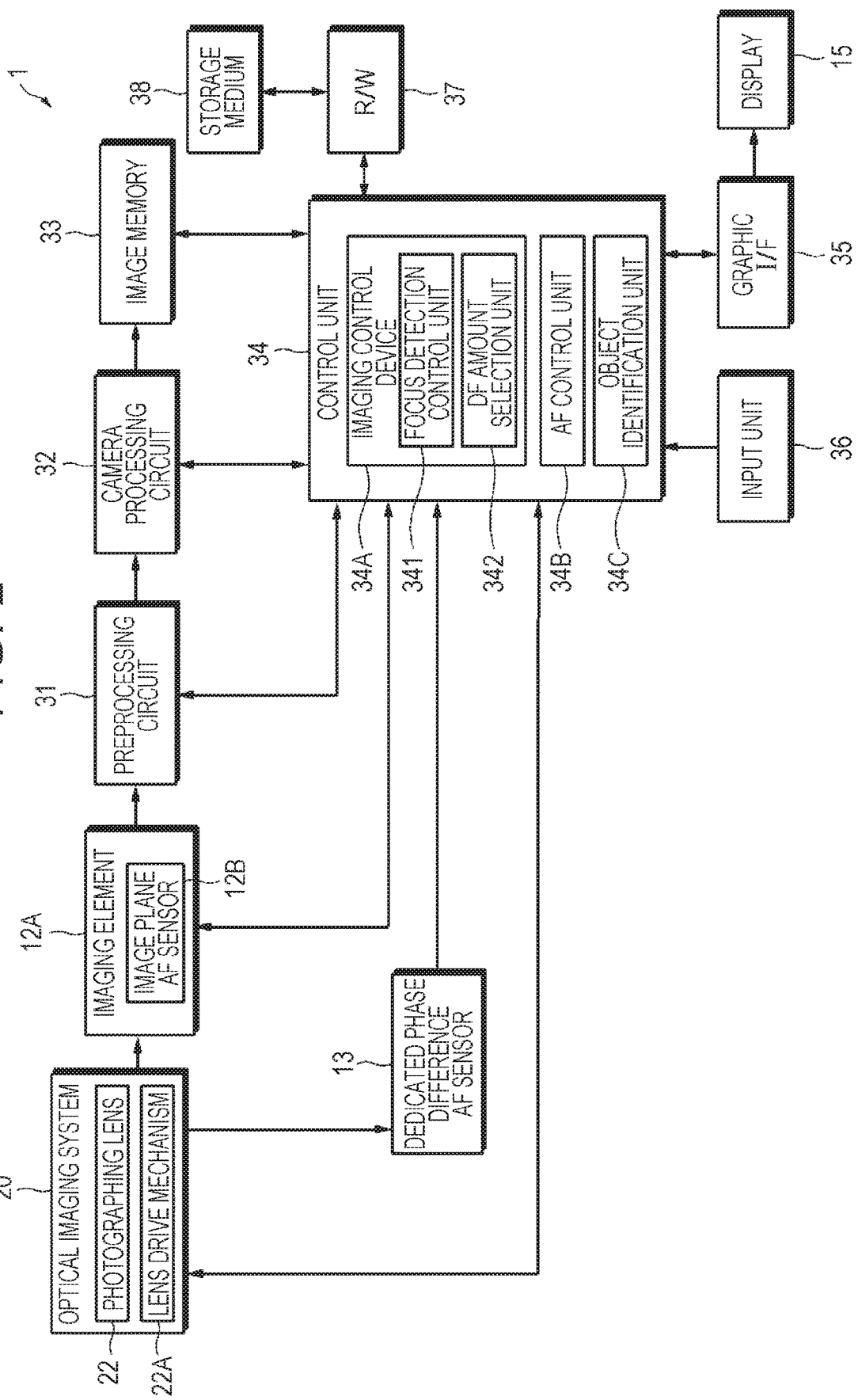
FIG. 2 is a block diagram illustrating an exemplary configuration of the imaging device according to the first embodiment of the present disclosure.

Next, an exemplary internal configuration of the imaging device 1 (mainly an exemplary configuration of signal processing) will be described with reference to a block diagram in FIG. 2. Besides the optical imaging system 20, the dedicated phase difference AF sensor 13, the imaging element 12A, the image plane AF sensor 12B, and the display 15 described above, the imaging device 1 includes, for example, a preprocessing circuit 31, a camera processing circuit 32, an image memory 33, a control unit 34, a graphic interface (I/F) 35, an input unit 36, a reader/writer (R/W) 37, and a storage medium 38.

The optical imaging system 20 includes, for example, the photographing lens 22 (including a focus lens and a zoom lens) for collecting light from an object on the imaging element 12A, a lens drive mechanism 22A that moves a focus lens to carry out a focus adjustment, a shutter mechanism, and an iris mechanism. These are driven on the basis of control signals from the control unit 34. The lens drive mechanism 22A achieves an AF operation by moving the photographing lens 22 along an optical axis direction in accordance with a control signal supplied from the control unit 34. An optical image of an object obtained via the optical imaging system 20 is formed on the imaging element 12A as an imaging device.

The dedicated phase difference AF sensor 13 is, for example, a sensor exclusively for auto-focusing in the phase difference detection system. Object light collected by the photographing lens 22 enters the dedicated phase difference AF sensor 13 by being reflected by the semi-transmissive mirror 11. A focus detection signal detected by the dedicated phase difference AF sensor 13 is supplied to the control unit 34.

The imaging element 12A has, as described above, normal imaging pixels and phase difference detection pixels. The image plane AF sensor 12B is a sensor for auto-focusing including a plurality of phase difference detection pixels. A focus detection signal detected by the image plane AF sensor 12B is supplied to the control unit 34.

The preprocessing circuit 31 subjects an imaging signal output from the imaging element 12A to, for example, sampling and holding so as to maintain a favorable signal/noise (S/N) ratio by correlated double sampling (CDS) processing. Furthermore, gain is controlled by auto gain control (AGC) processing and a digital image signal is output by analog/digital (A/D) conversion.

The camera processing circuit 32 subjects an image signal from the preprocessing circuit 31 to signal processing such as white balance adjustment processing, color correction processing, gamma correction processing, Y/C conversion processing, and auto exposure (AE) processing.

The image memory 33 is a volatile memory, for example, a buffer memory including a dynamic random access memory (DRAM), and temporarily stores image data subjected to predetermined processing by the preprocessing circuit 31 and the camera processing circuit 32.

The control unit 34 includes, for example, a central processing unit (CPU), a random access memory (RAM), and a read only memory (ROM). The ROM stores, for example, programs read and operated by the CPU. The RAM is used as a work memory of the CPU. The CPU controls the whole imaging device 1 by executing various types of processing in accordance with programs stored in the ROM to issue commands.

The control unit 34 also has, for example, an imaging control device 34A, an AF control unit 34B, and an object identification unit 34C as a functional block. The imaging control device 34A has, for example, a focus detection control unit 341 and a DF amount selection unit 342 as a functional block. The focus detection control unit 341 controls, for example, arrangement of AF areas (ranging areas) on a photographing screen displayed on the display 15. The DF amount selection unit 342 selects one defocus amount in accordance with a predetermined condition from among a plurality of defocus amounts obtained on the basis of AF areas adjusted by the focus detection control unit 341. Meanwhile, specific operation examples of the focus detection control unit 341 and the DF amount selection unit 342 will be described later.

The AF control unit 34B controls the lens drive mechanism 22A of the optical imaging system 20 on the basis of a defocus amount selected by the DF amount selection unit 342. In response to the control of the lens drive mechanism 22A, a lens is moved a predetermined amount along an optical axis direction to carry out auto-focus control to focus on an object.

The object identification unit 34C detects objects such as a human and an object in a processed image by a known object detection technique. As an object detection method, a face/object recognition technique by template matching, a matching method based on luminance distribution information of an object, a method based on, for example, parts of skin color or an amount of characteristics of a human face included in an image, and the like can be used. In addition, these methods may be combined to improve detection accuracy.

The graphic I/F 35 generates an image signal for displaying on the display 15 from an image signal supplied from the control unit 34, and displays an image by supplying this signal to the display 15. The display 15 displays, for example, through images during imaging and images recorded in the storage medium 38.

The input unit 36 includes, for example, a power button for switching power on/off, a release button for issuing an instruction to start recording a captured image, an operation element for zoom adjustment, and a touch screen integrated with the display 15. Once input is carried out into the input unit 36, a control signal in accordance with the input is generated to output to the control unit 34. Then, the control unit 34 carries out calculation processing and control in accordance with the control signal.

The R/W 37 is an interface to which the storage medium 38 that records, for example, image data generated by imaging is connected. The R/W 37 writes data supplied from the control unit 34 into the storage medium 38 and outputs data read from the storage medium 38 to the control unit 34. The storage medium 38 is a mass storage medium such as a hard disc, Memory Stick (registered trademark of Sony Corporation), and a SD memory card. Images are stored in a compressed state on the basis of standards such as JPEG. Exchangeable image file format (EXIF) data including additional information such as information on stored images and imaging date and time are also stored while being associated with the images.

[Exemplary Basic Operations of Imaging Device]

Here, basic operations of the imaging device 1 will be described. Before an image is captured, signals photoelectrically converted from light received by the imaging element 12A are sequentially supplied to the preprocessing circuit 31. In the preprocessing circuit 31, an input signal is subjected to, for example, CDS processing and AGC processing, and then converted into an image signal.

The camera processing circuit 32 subjects the image signal supplied from the preprocessing circuit 31 to image quality correction processing to supply to the graphic I/F 35 as a signal of a through image via the control unit 34. As a result, a through image is displayed on the display 15. A user can adjust an angle of view by looking at the through image displayed on the display 15.

When a shutter button of the input unit 36 is pushed down in this condition, the control unit 34 outputs a control signal to the optical imaging system 20 to operate a shutter included in the optical imaging system 20. Consequently, image signals for one frame are output from the imaging element 12A.

The camera processing circuit 32 subjects the image signals for one frame supplied from the imaging element 12A via the preprocessing circuit 31 to image quality correction processing, and supplies the processed image signals to the control unit 34. The control unit 34 compression-encodes the input image signals and supplies the generated encoded data to the R/W 37. As a result, a data file of captured still images is stored in the storage medium 38 via the R/W 37.

On the other hand, in a case where an image file stored in the storage medium 38 is reproduced, the control unit 34 reads a selected still image file from the storage medium 38 via the R/W 37 in accordance with operation input from the input unit 36. The read image file is subjected to expansion decoding processing. Then, the decoded image signals are supplied to the graphic I/F 35 via the control unit 34. Consequently, the still images stored in the storage medium 38 are displayed on the display 15.

[Phase Difference Detection Pixels]

Figure 3:
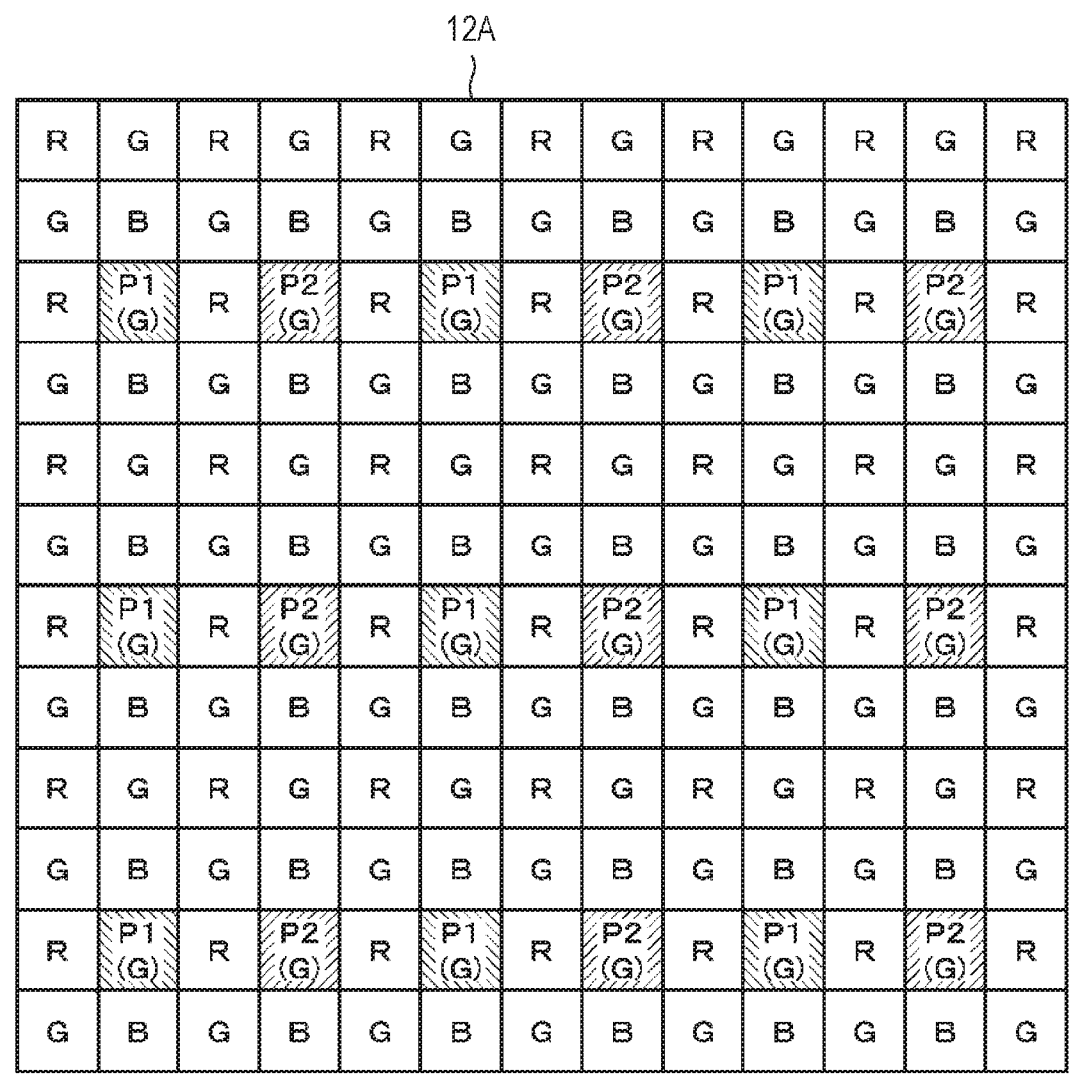

Next, an example of phase difference detection pixels will be described in detail. As illustrated in FIG. 3, the imaging element 12A has first phase difference detection pixels P1 and second phase difference detection pixels P2 as phase difference detection pixels that carry out phase difference detection. Phase difference detection pixels have the first phase difference detection pixels P1 paired with the second phase difference detection pixels P2, and carry out pupil division of the photographing lens 22. The first phase difference detection pixels P1 and the second phase difference detection pixels P2 are different from normal imaging pixels in optical characteristic. The image plane AF sensor 12B includes a plurality of pairs of phase difference detection pixels.

FIGS. 4A and 4B are views illustrating configurations of the phase difference detection pixels. FIG. 4A illustrates the first phase difference detection pixel P1, and FIG. 4B illustrates the second phase difference detection pixel P2.

The first phase difference detection pixel P1 has a light receiving element 111. In addition, a microlens 112 is provided on a light incident side. A light shielding layer 113 that shields incident light is also provided between the light receiving element 111 and the microlens 112 in order to carry out pupil division. The light shielding layer 113 has an opening portion 114 eccentric from a center of the light receiving element 111 toward one side.

The first phase difference detection pixel P1 is configured in this way. Therefore, as illustrated in FIG. 4A, only part of incident light enters the light receiving element 111.

The second phase difference detection pixel P2 has a light receiving element 121. In addition, a microlens 122 is provided on a light incident side. A light shielding layer 123 that shields incident light is also provided between the light receiving element 121 and the microlens 122 in order to carry out pupil division. The light shielding layer 123 has an opening portion 124 eccentric from a center of the light receiving element 121 toward one side.

The light shielding layer 123 shields incident light on a side opposite from a direction in which the light shielding layer 113 shields incident light in the first phase difference detection pixel P1. Thus, the first phase difference detection pixel P1 and the second phase difference detection pixel P2 each shield light on a side opposite to a ranging direction.

The second phase difference detection pixel P2 is configured in this way. Therefore, as illustrated in FIG. 4B, only part of incident light enters the light receiving element 121.

The phase difference detection pixels are configured in this way, and use of output therefrom allows so-called image plane phase difference AF. However, the phase difference detection pixels may function only as phase difference detection pixels and not as normal pixels, or may function for imaging and phase difference detection with one pixel including two independent photodiodes. This type of pixel can take in light through two photodiodes independently, and detects during autofocusing a phase difference signal from each photodiode to function as a phase difference detection pixel, and functions during photographing as one normal pixel to output an image signal. In addition, the imaging element 12A may be of any type as long as phase difference detection besides a normal photographing function can be carried out, such as an imaging element 12A that has a structure with an imaging sensor and an image plane phase difference AF sensor laminated.

Meanwhile, in FIG. 3, the G pixels are assumed to be phase difference detection pixels. This is because G pixels exist twice R and B pixels. However, the phase difference detection pixels are not limited to the G pixels.

Figure 5:
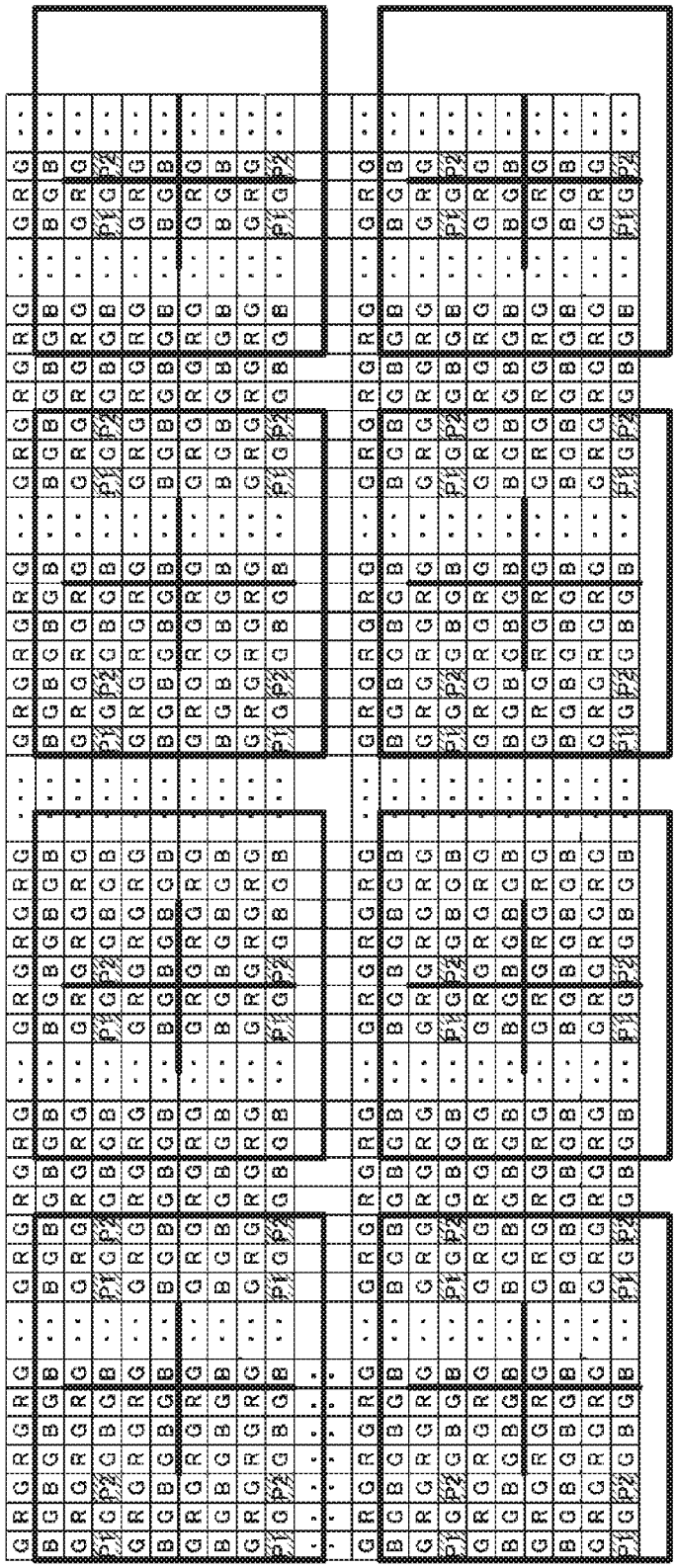
FIG. 5 describes a configuration of image plane AF areas.

The phase difference detection pixels are, as illustrated in FIG. 5, embedded in the imaging element 12A so as not to affect a photographed image. In a horizontal direction, one pair of elements (P1 and P2) partly apertured and subjected to pupil division for detecting a phase difference is arranged in parallel. In addition, in a vertical direction, these lines of phase difference detection pixels are embedded every few lines.

Figure 6:
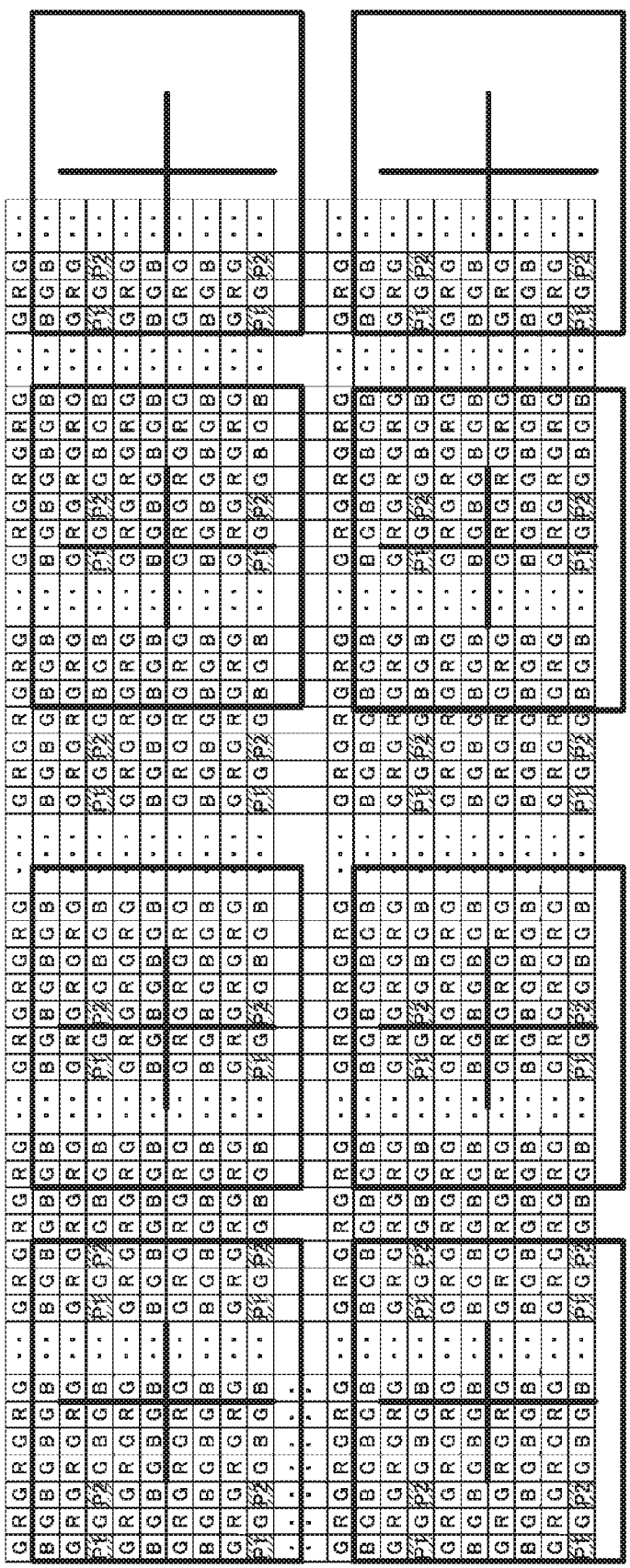
FIG. 6 describes a configuration of image plane AF areas.

For these phase difference detection pixels thus arranged, AF areas are set with a plurality of phase difference detection pixels as one set (for example, thick-line rectangular frames in FIG. 5) to carry out focus detection calculation for each of the areas. Thus, it is possible to ununiformly arrange the AF areas by shifting setting of the AF areas as illustrated in FIG. 6. In other word, it is possible to arbitrarily set the arrangement of the AF areas through processing in software.

Figure 7A:
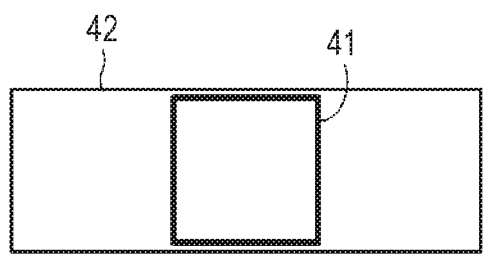
FIGS. 7A to 7C describe a relationship between phase difference detection pixels and AF areas.

Next, a relationship between the AF areas that are regions subjected to defocus amount calculation and phase difference detection pixels provided in the imaging element 12A will be described with reference to FIGS. 7A to 7C. FIG. 7A extracts and illustrates one AF area 41 in a photographing range and a region used for detection by a phase difference detection pixel corresponding thereto (hereinafter referred to as the phase difference pixel region 42). As illustrated in FIG. 7A, the AF area 41 indicated with a thick line and the phase difference pixel region 42 corresponding thereto indicated with a thin line are not identical in shape and size, and the phase difference pixel region 42 is normally larger than the AF area 41.

Figure 7B:
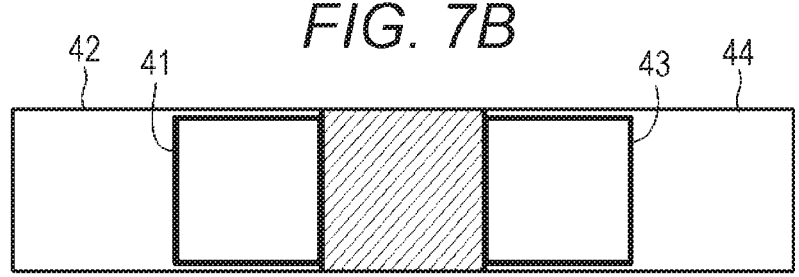
Figure 7C:
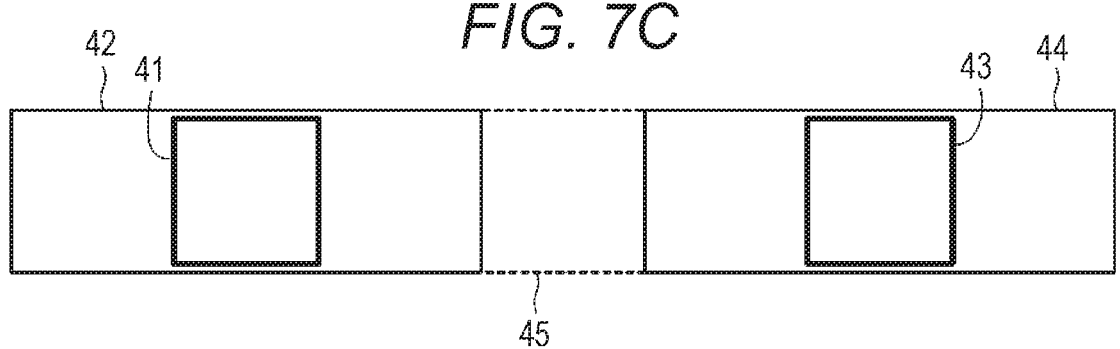

Thus, as illustrated in FIG. 7B, even in a case where a plurality of AF areas, 41 and 43, is sparsely arranged at a distance, phase difference pixel regions 42 and 44 for the AF areas 41 and 43, respectively, may overlap each other (a shaded part in FIG. 7B). Therefore, even in a case where a plurality of AF areas is sparsely arranged at a distance, all of the phase difference detection pixels may be used. Meanwhile, as illustrated in FIG. 7C, in a case where the AF areas 41 and 43 are sparsely arranged at a large distance and the phase difference pixel regions 42 and 44 corresponding thereto, respectively, do not overlap each other, operations of a phase difference detection pixel corresponding to a phase difference pixel region 45 that is not used for detection (a broken-line part in FIG. 7C) are stopped.

With the configuration above, the imaging device 1 can carry out AF by an image plane phase difference. It is also possible to carry out AF by the dedicated phase difference AF sensor 13. Each AF can be carried out, for example, in parallel independently in a series of AF sequences. Thus, it is possible to obtain a signal based on each AF in the AF sequences.

[Characteristics of Each AF System]

Next, characteristics of AF by the dedicated phase difference AF sensor 13 and by the image plane phase difference will be described. Each AF system has advantages and disadvantages.

Generally, the dedicated phase difference AF sensor 13 often includes a line sensor in a vertical direction, and can correspond to a horizontal pattern of an object. Advantages of the AF system by the dedicated phase difference AF sensor 13 include, for example, points described below.

Even when an object blurs significantly, detection can be carried out due to a dedicated optical system. Pull-in from a large blur is fast. Pull-in means, for example, response until a lens position is driven to a focusing position in AF processing.

Tolerance to low luminance is high due to a large dedicated sensor.

On the other hand, disadvantages of the AF system by the dedicated phase difference AF sensor 13 include, for example, points described blow.

When cross ranging is intended to be carried out in many areas in vertical and horizontal directions, a size of an AF sensor becomes large due to a necessity for an optical system exclusively for AF areas.

Restrictions in the optical system make it difficult to arrange AF areas in a periphery.

Installation of an AF sensor in a position different from an image plane may cause mechanical installation errors.

Limitation of a luminous flux by a fixed diaphragm mask in an AF sensor makes it difficult to improve AF accuracy in mounting a bright lens with an F value of F1.4, for example.

Advantages of the AF system by the image plane phase difference include, for example, points described below.

AF areas can be arranged in a large region in the imaging element 12A. Therefore, AF areas by the image plane phase difference can also be arranged on AF areas by the dedicated phase difference AF sensor 13.

Ranging on an image plane of the imaging element 12A leads to high accuracy.

Ranging with a lens open can make a baseline length longer, which leads to high accuracy.

On the other hand, disadvantages of the AF system by the image plane difference include, for example, points described below.

Lack of a dedicated optical system makes ranging difficult when a large blur occurs.

Tolerance to low luminance is low due to use of pixels of the imaging element 12A.

Restrictions on a reading direction of the imaging element 12A often make it possible to detect only vertical patterns.

Some of these characteristics are listed in Table 1 below.

TABLE 1

| | DEDICATED PHASE DIFFERENCE AF SENSOR | IMAGE PLANE PHASE DIFFERENCE AF SENSOR |
|---|---|---|
| DETECTION PERFORMANCE OF LARGELY BLURRED OBJECT | ◯ | X |
| FREEDOM DEGREE OF AREA ARRANGEMENT | X | ◯ |

Thus, in the photographing range, AF areas by the dedicated phase difference AF sensor 13 are made correspond to AF areas by the image plane phase difference. For example, AF areas by the dedicated phase difference AF sensor 13 overlap AF areas by the image plane phase difference. However, as described using FIGS. 7A to 7C, AF areas by the image plane phase difference may be different from a range of phase difference detection pixels used for calculation corresponding to the AF areas. Thus, AF areas by the dedicated phase difference AF sensor 13 may overlap a range of phase difference detection pixels used for AF by the image plane phase difference. This makes it possible to realize AF taking advantages of both AF systems and also realize a cross sensor capable of detecting vertical and horizontal patterns in overlapping areas. Note that the photographing range means, for example, a range within a photographing view angle of the imaging device 1, and is a range of an object obtained as image data.

Figure 8:
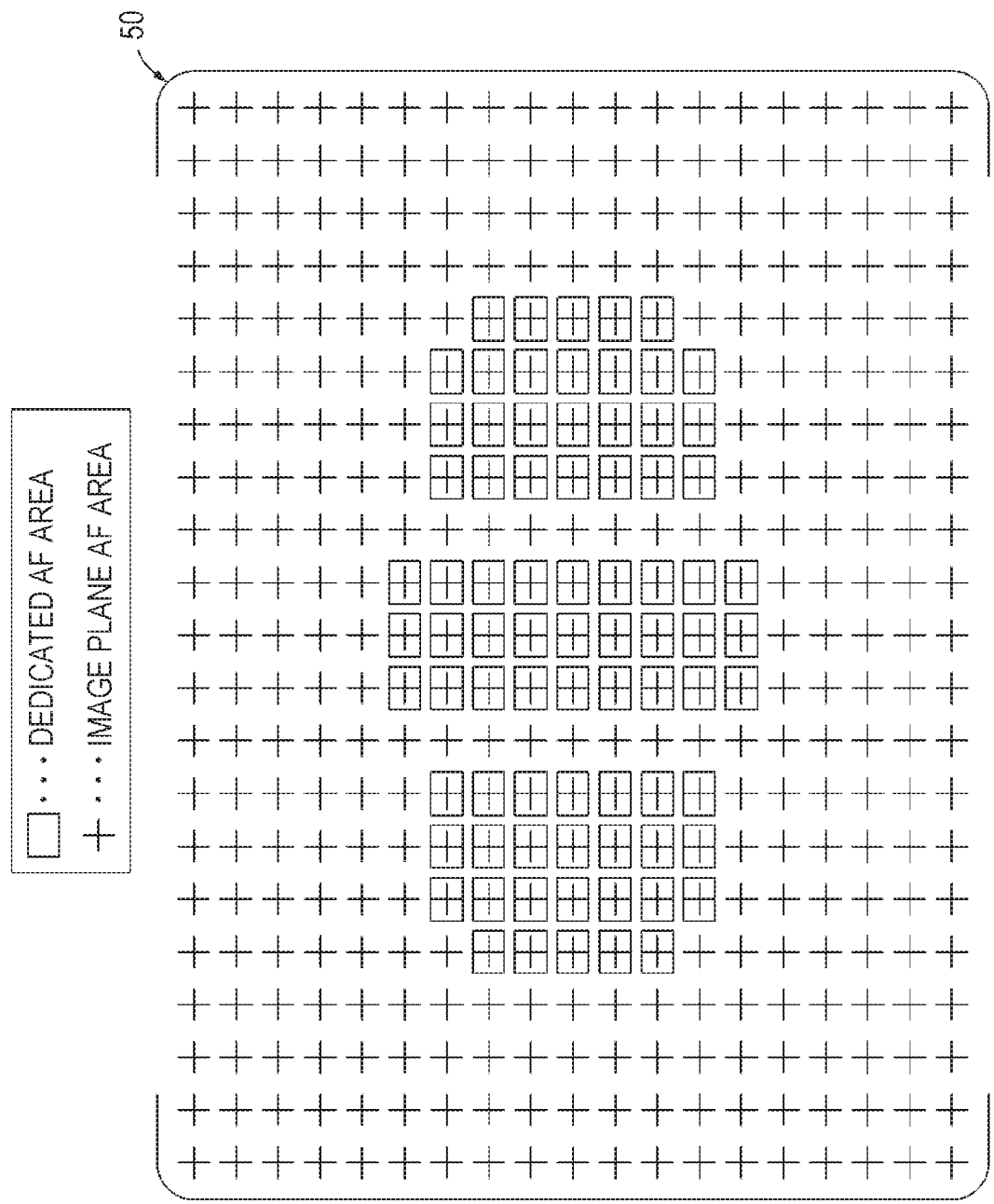
FIG. 8 illustrates an exemplary arrangement of image plane AF areas and dedicated AF areas in a photographing range.

A specific example of AF area arrangement will be described below. FIG. 8 illustrates AF areas in a photographing range 50 by the dedicated phase difference AF sensor 13 (hereinafter referred to as the dedicated AF areas) and AF areas in the photographing range 50 by the image plane AF sensor 12B (hereinafter referred to as the image plane AF areas). Meanwhile, the exemplary AF arrangement in FIG. 8 illustrates an exemplary arrangement in an initial state (for example, a state where AF areas are arranged over a whole range or a predetermined range of the photographing range 50 after the imaging device 1 is started).

In FIG. 8, dedicated AF areas are indicated by square frames. As can be seen from FIG. 8, the dedicated AF areas are arranged in a narrow range compared with the image plane AF areas, and concentrate substantially around a center.

In FIG. 8, image plane AF areas are indicated by crosses. As can be seen from FIG. 8, the image plane AF areas spread over a wide range, and an object can be captured in a wide range.

Meanwhile, the AF areas illustrated in FIG. 8 are a region corresponding to calculation for carrying out auto-focus control, and different from a frame as a user interface (UI) displayed for a user (for example, a frame in a rectangular shape).

[Sizes of AF Areas]

Next, sizes of the AF areas will be described. Generally, in the phase difference AF system, when an object is small, the object on a close-range side and a distant view on a background side simultaneously enter one AF area, which may cause a phenomenon where proper AF is difficult to carry out. This phenomenon is called a perspective conflict.

Here, in a case where sizes of AF areas are large, the perspective conflict described above may occur, whereas an advantage is offered that detection performance of a largely blurred object is high. On the other hand, in a case where sizes of AF areas are small, spot property of AF increases, AF accuracy for fine objects (such as flowers, pupils, and small animals) is high, and the perspective conflict is unlikely to occur, but detection performance of a largely blurred object declines. These sizes of AF areas and characteristics corresponding to the sizes are listed in Table 2 below.

TABLE 2

| | AF AREA SIZE (SMALL) | AF AREA SIZE (LARGE) |
|---|---|---|
| SPOT PROPERTY | ◯ | X |
| DETECTION OF LARGELY BLURRED OBJECT | X | ◯ |

[Exemplary Setting of AF Areas in First Embodiment]

An exemplary setting of the AF areas according to the first embodiment in consideration of characteristics based on AF systems and sizes of AF areas will be described below.

Figure 9:
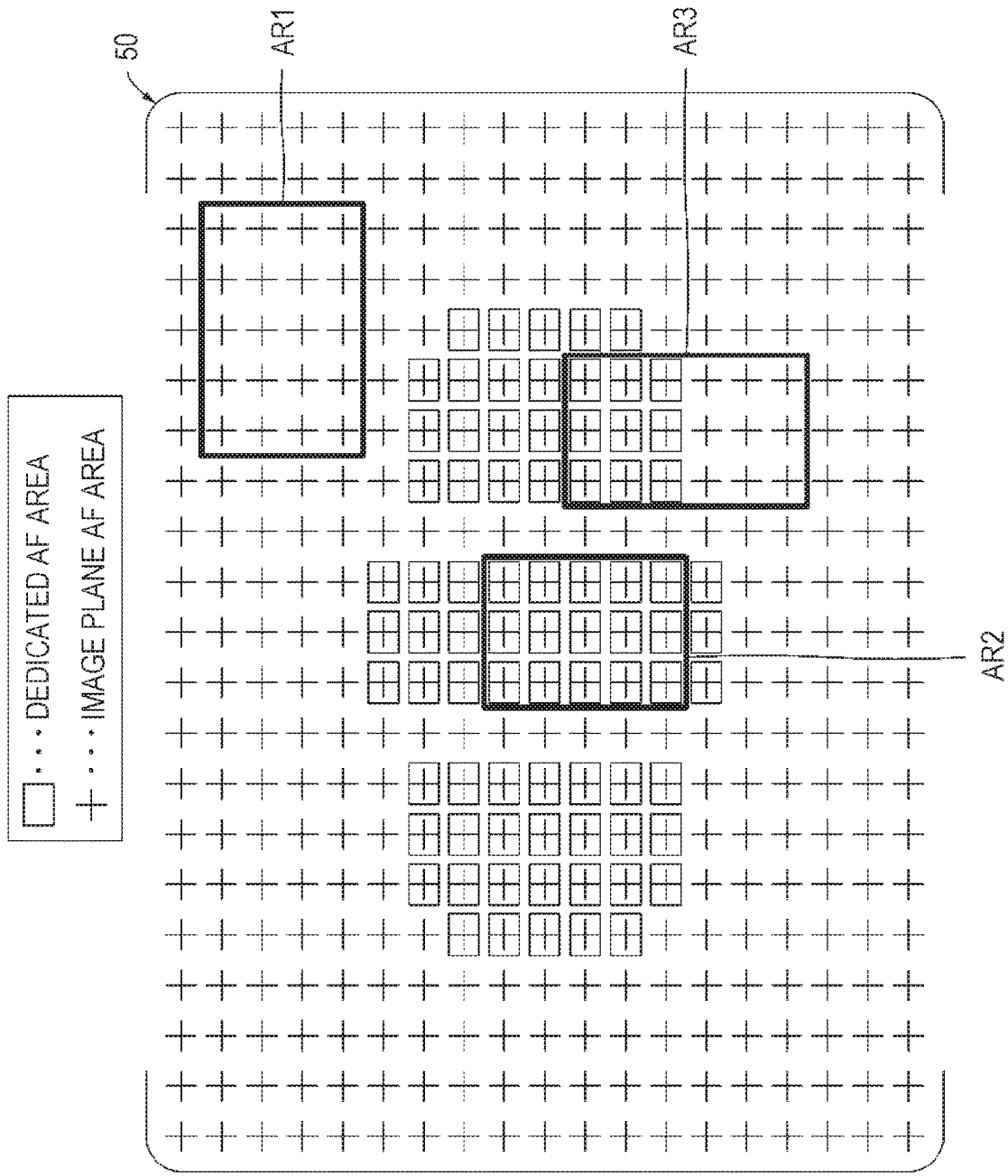
FIG. 9 describes an example of setting areas.

FIG. 9 illustrates setting areas set in a photographing range displayed on the display 15. In FIG. 9, as an example of setting areas, a setting area AR1 where dedicated AF areas do not exist and setting areas where dedicated AF areas exist are exemplified. As a setting area where dedicated AF areas exit, a setting area AR2 where areas of only image plane AF areas do not exist and a setting area AR3 where areas of only image plane AF areas exist are exemplified.

The setting area AR1 and the like are, for example, areas set in response to an input operation by a user. The setting area AR1 and the like may be automatically defined for an object detected through object processing. Meanwhile, rectangular thick-line frames demarcating the setting areas ARs illustrated in FIG. 9 are frames displayed for a user. A user can arbitrarily change sizes of the frames (frame sizes) by executing operations for the displayed frames.

(Concentrated Arrangement of AF Areas)

Figure 10:
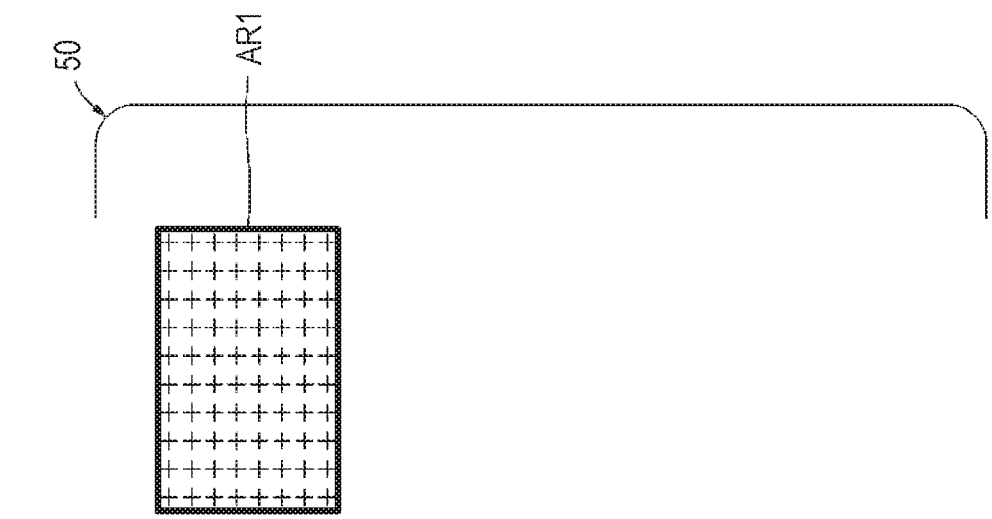
FIG. 10 describes a concentrated arrangement of image plane AF areas in a setting area.

In the first embodiment, for example, AF areas are concentratedly arranged in the setting areas. This control is carried out by the focus detection control unit 341. For example, as illustrated in FIG. 10, image plane AF areas are densely arranged in the setting area AR1. The phrase "densely arranged" means that spaces among a plurality of AF areas in a setting area (e.g., a density of first image plane phase detection areas or a number of first image plane phase detection areas) are made narrower than spaces among a plurality of AF areas in an external region (e.g., a density of second image plane phase detection areas or a number of second image plane phase detection areas) to arrange close to one another, or means that AF areas are arranged only in a setting area and not in an external region. For example, in a case where 400 image plane AF areas are arranged all over the photographing range 50, 400 image plane AF areas or a predetermined number of image plane AF areas are concentratedly arranged in the setting area AR1.

Processing for dense arrangement of image plane AF areas in the setting area AR1 is carried out, for example, as described below. In a case where the setting area AR1 is, for example, square, the total number of vertical and horizontal image plane AF areas is a predetermined number in accordance with a size of the setting area AR1, and arrangement of the image plane AF areas is determined such that those image plane AF areas are uniformly arranged in the setting area AR1 at a distance in accordance with the size of the setting area AR1.

The number of and spaces among image plane AF areas in accordance with the size of the setting area AR1 can be obtained, for example, by referring a table where the size of the setting area AR1 is made correspond to the number of and spaces among the image plane AF areas, kept in advance by the focus detection control unit 341. The number of and spaces among image plane AF areas in accordance with the size of the setting area AR1 may also be obtained from an arithmetic expression that indicates a correspondence relationship between the size of the setting area AR1 and the number of and spaces among the image plane AF areas.

The focus detection control unit 341 determines arrangement of the image plane AF areas such that spaces among the image plane AF areas in the setting area AR1 are narrower than those in external areas other than the setting area AR1 in the photographing range 50. Concentrated and dense arrangement of the image plane AF areas in the setting area AR1 in this manner can improve auto-focus accuracy for the current object.

Figure 11:
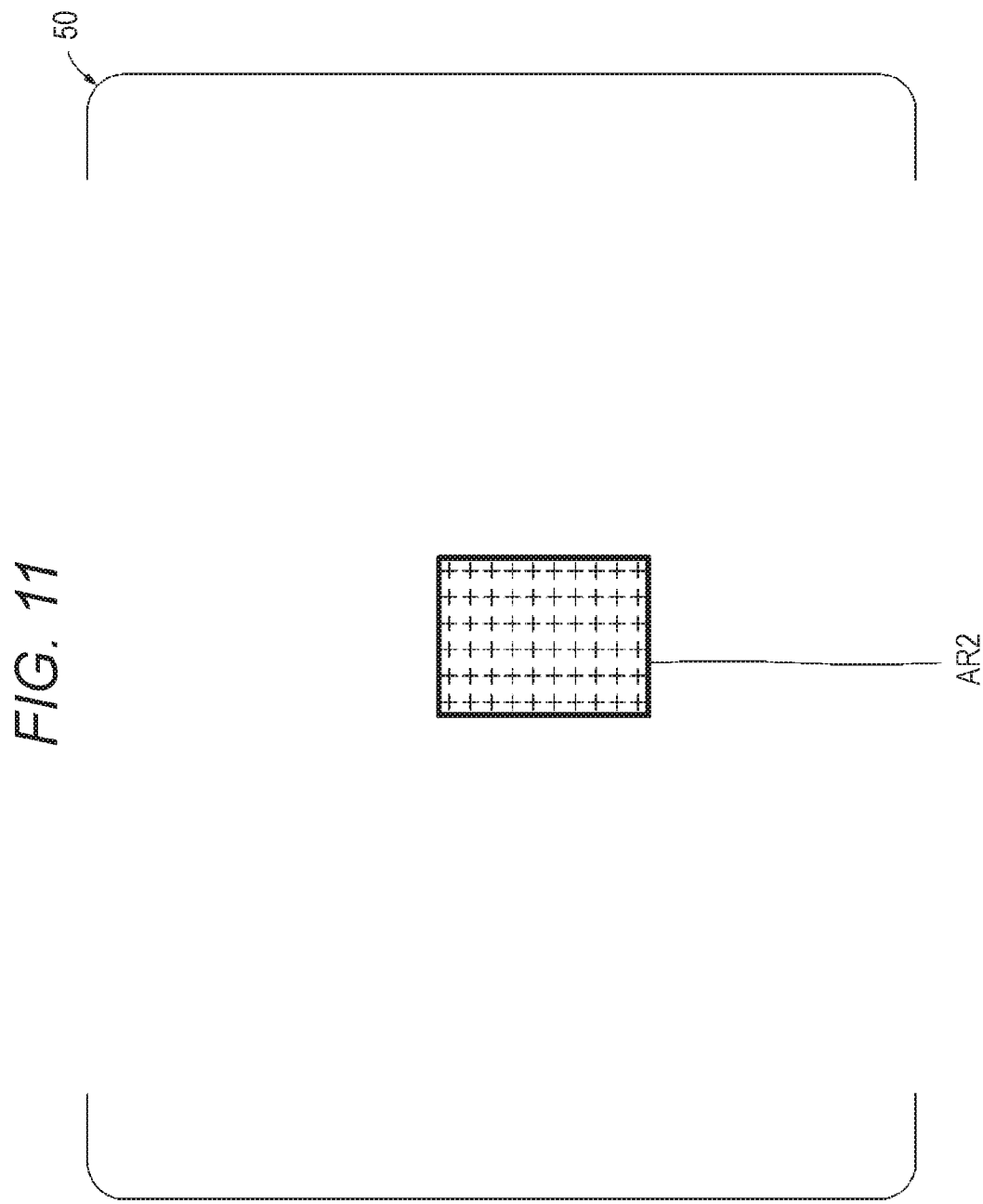
FIG. 11 describes a concentrated arrangement of image plane AF areas in a setting area.
Figure 12:
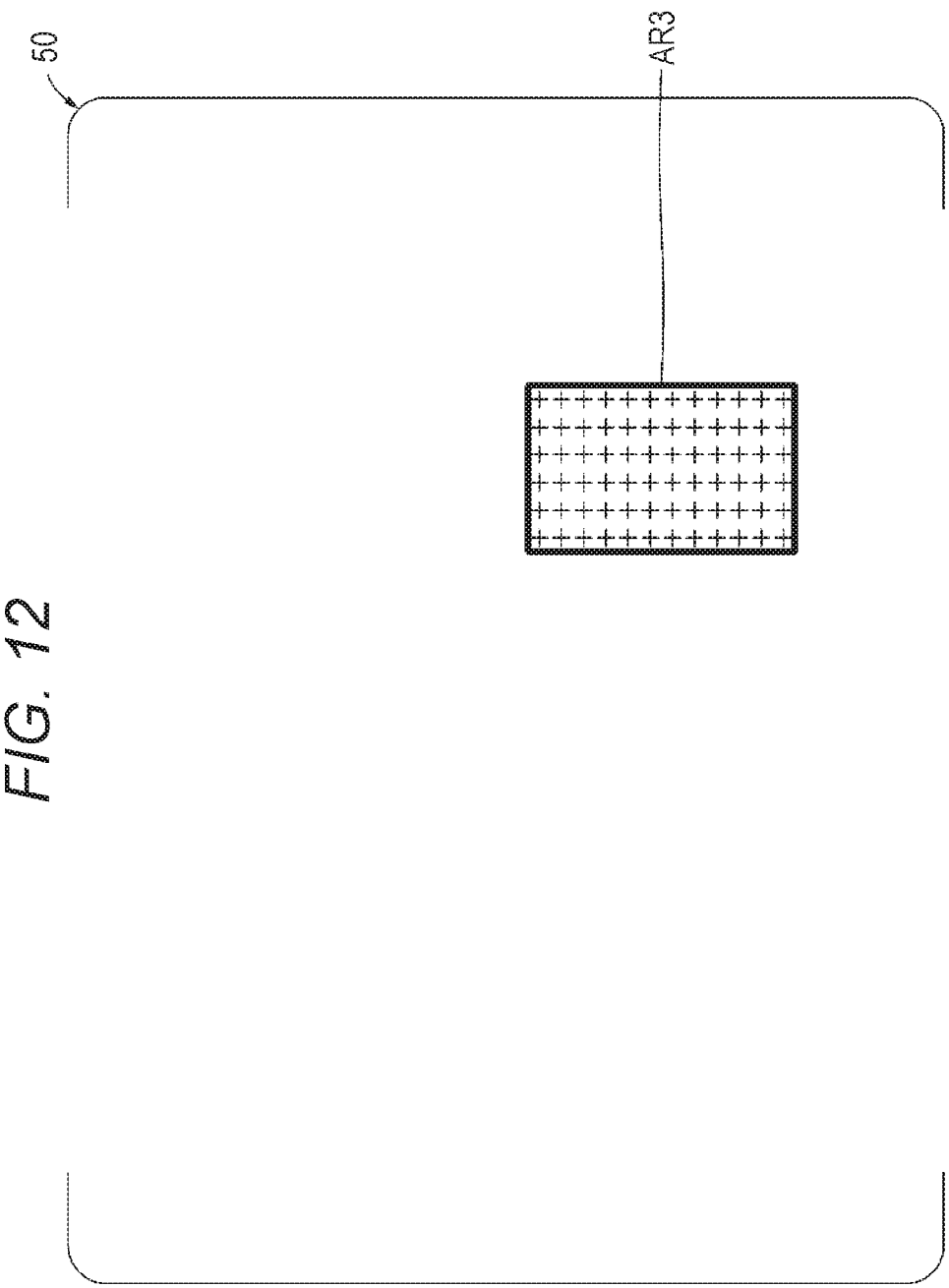
FIG. 12 describes a concentrated arrangement of image plane AF areas in a setting area.

As illustrated in FIGS. 11 and 12, such concentrated arrangement of the image plane AF areas can be equally applied to the setting areas AR2 and AR3, similarly. However, the examples illustrated in FIGS. 10 to 12 are to describe concentrated arrangement of the image plane AF areas, and the number of and spaces among the image plane AF areas in the figures are illustrated only schematically.

Meanwhile, some imaging elements can select and independently read only signals from phase difference detection pixels. In a case where such imaging elements are used, and in a case where the setting area AR1 (setting areas AR2 and AR3 are also acceptable) is set on the basis of, for example, an object detection technique or input by a user, signals may be read only from phase difference detection pixels included in the setting area AR1. In this case, reading from phase difference detection pixels not included in the setting area AR1 is not carried out. Therefore, as illustrated in FIGS. 10 to 12, image plane AF areas are not arranged except in the setting area AR1. This makes it possible to concentrate calculation resources for auto-focus only on the setting area AR1 and achieve, for example, reduction of processing loads, speeding-up of detection processing, reduction of data rate, and reduction of power consumption. Note that, in this case, as for normal pixels, reading is carried out from all of the normal pixels.

(Adjustment of AF Areas)

Next, the focus detection control unit 341 adjusts AF areas. For example, image plane AF areas are set differently (e.g., different types of range finding areas) depending on whether dedicated AF areas exist in a setting area set in the photographing range 50 of the imaging unit. Specific examples will be described below.

Figure 13:
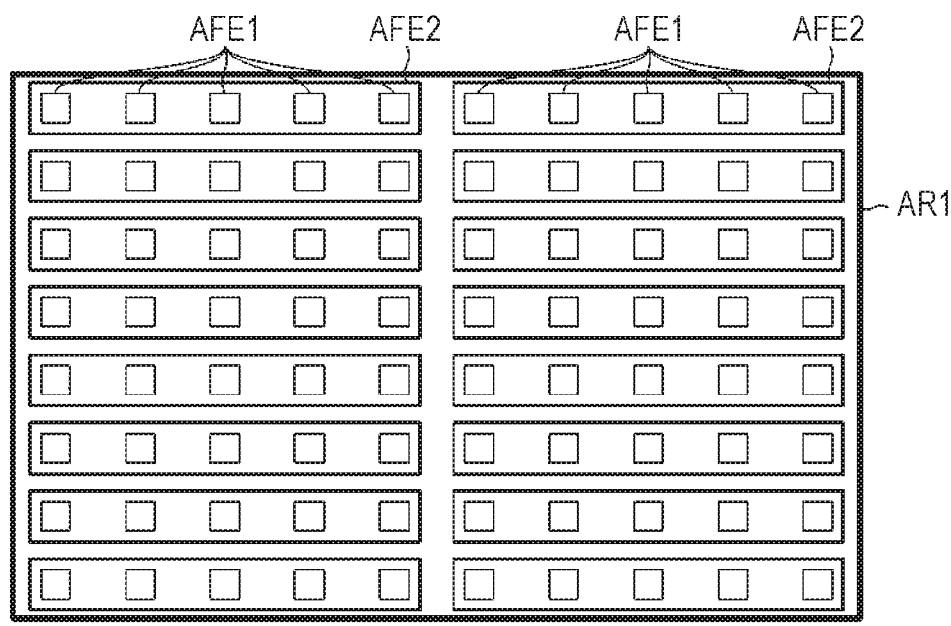
FIG. 13 describes an exemplary arrangement of image plane AF areas in a setting area.

FIG. 13 is a specific example of the setting area AR1. The setting area AR1 is a region of only image plane AF areas. In this case, by setting AF areas AFE1 in a small frame size (first ranging areas or a "first type"), spot property of AF is improved, and AF areas AFE2 in a frame size (second ranging areas or a "second type") larger than the AF areas AFE1 are set. This makes it possible to increase detection performance of large DF which is difficult to deal with by the image plane AF system. Spot property of AF means, for example, AF accuracy for a small (fine) object. In a case where this spot property is low, different objects and background around an object are focused on. Meanwhile, frame sizes, numbers, and positions, for example, of the AF areas AFE1 and AFE2 in FIG. 13 are illustrated only schematically. The same is true in other drawings.

Note that, in the example illustrated in FIG. 13, the AF areas AFE1 and AFE2 overlap each other, but may be arranged independently from each other (non-overlappingly).

Figure 14:
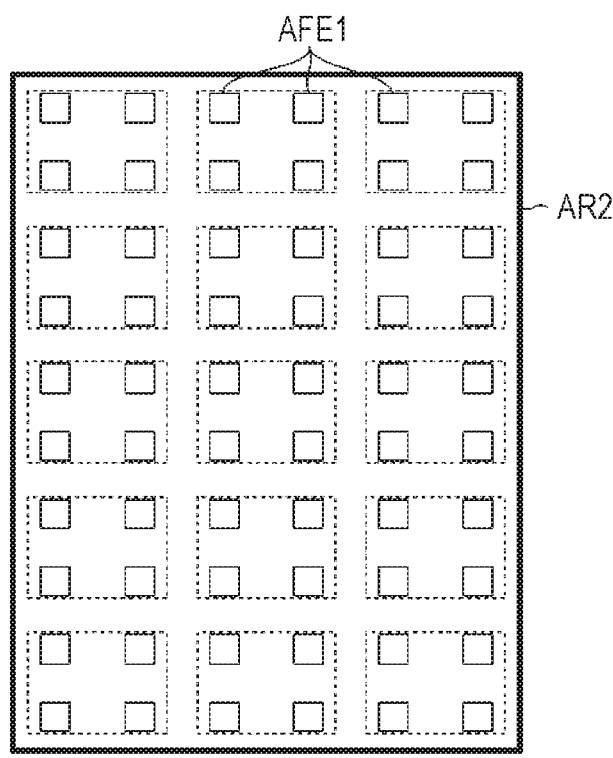
FIG. 14 describes an exemplary arrangement of image plane AF areas in another setting area.

FIG. 14 is a specific example of the setting area AR2. The setting area AR2 has dedicated AF areas. Meanwhile, in FIG. 14, dedicated AF areas are indicated by dotted rectangles. In this case, the dedicated phase difference AF sensor 13 is superior in detection performance of a largely blurred object. Therefore, in the image plane AF areas, small AF areas AFE1 are arranged concentratedly in order to increase spot property around a focusing position. This makes it possible to increase detection performance of large DF and also increase spot property of AF.

Figure 15:
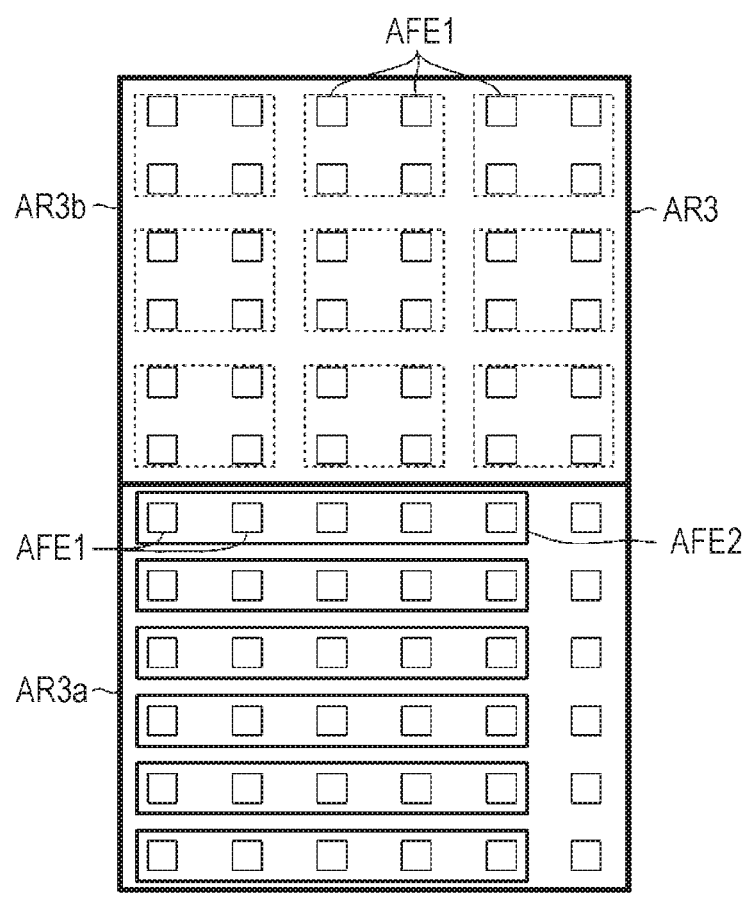
FIG. 15 describes an exemplary arrangement of image plane AF areas in yet another setting area.

FIG. 15 is a specific example of the setting area AR3. In this case, for example, the setting area AR3 is divided into an area excluding dedicated AF areas (setting area 3*a*) and an area including dedicated AF areas (setting area 3*b*). In the setting area 3*a*, as with the case of FIG. 13, AF areas AFE1 in a small frame size are set and AF areas AFE2 in a large frame size are set as well. In the setting area 3*b*, as with the case of FIG. 14, a number of AF areas AFE1 in a small frame size are set.

On the other hand, in a case where the setting area AR3 is not divided and a setting area includes even a part of dedicated AF areas, it is possible to arrange similarly to FIG. 14 and simplify processing. It is also possible, for example, to mix and arrange dedicated AF areas, image plane AF areas in a large frame size, and image plane AF areas in a small frame size in a setting area. In this arrangement, it is assumed, for example, that a result of the image plane AF areas in a small frame size is low contrast, a result of the image plane AF areas in a large frame size is large DF and effective, and a result of dedicated AF areas is large DF and effective. Here, that a result is low contrast means, for example, that contrast of an object is extremely low with no parts for matching of correlation calculation processing in phase difference AF processing (no lens positions where a contrast value becomes high in contrast AF processing) and difficulty to focus. Being effective means that an evaluation value is higher than a certain level with reliability enough to be used for calculation, for example. In such a case, the dedicated phase difference AF sensor 13 is higher in detection accuracy of large DF, and thus, the result of the dedicated AF areas is adopted. It is also assumed that a result of the image plane AF areas in a small frame size is effective and highly reliable, a result of the image plane AF areas in a large frame size is effective and poorly reliable, and a result of the dedicated phase difference AF is effective. In this case, output from the image plane AF areas in a small frame size that are highly reliable and effective for a small object is adopted.

Figure 16:
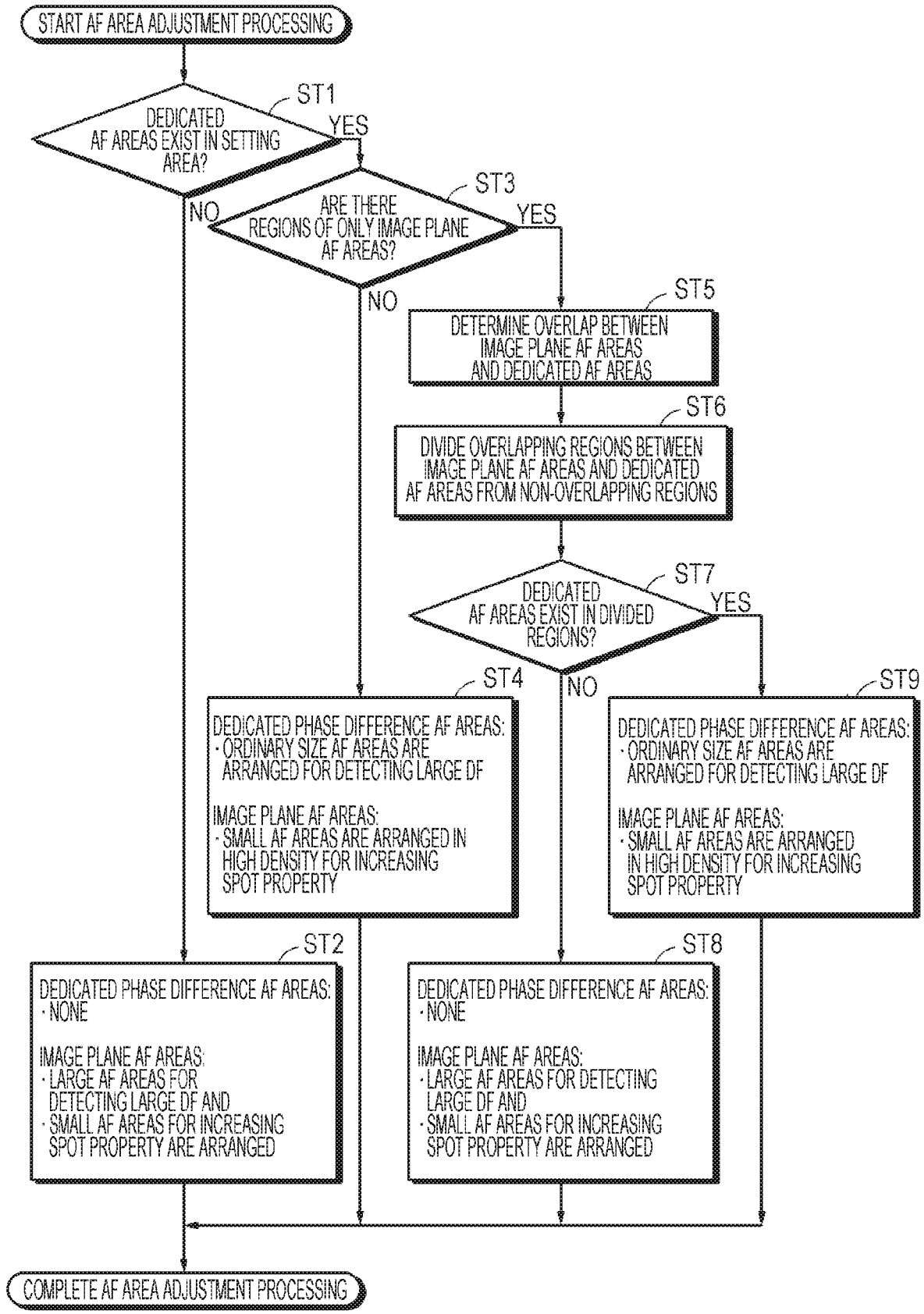
FIG. 16 is a flowchart for describing an AF area adjustment processing flow.

FIG. 16 is a flowchart for describing an example of AF area adjustment processing flow. Following processing is carried out by, for example, the focus detection control unit 341 in the imaging control device 34A.

In Step ST1, it is determined whether dedicated AF areas exist in a setting area. If dedicated AF areas do not exist in a setting area (for example, in the case of the setting area AR1 illustrated in FIG. 13), processing proceeds to Step ST2.

In Step ST2, following processing is carried out. Dedicated AF areas do not exist in the setting area AR1 and thus are difficult to use. In this case, in the setting area AR1, AF areas in a large frame size (AF areas AFE2) and AF areas in a small frame size (AF areas AFE1) are arranged in order to detect large DF and increase spot property of AF, respectively.

In the determination processing in Step ST1, if dedicated AF areas exist in a setting area, processing proceeds to Step ST3. In Step ST3, it is determined whether regions of only image plane AF areas exist in a setting area. If regions of only image plane AF areas do not exist (for example, in the case of the setting area AR2 illustrated in FIG. 14), processing proceeds to Step ST4.

In Step ST4, following processing is carried out. As for dedicated AF areas, AF areas in a normal frame size are arranged for detecting large DF. A normal frame size means, for example, a predetermined frame size. On the other hand, as for image plane AF areas, AF areas in a small frame size (AF areas AFE1) are arranged in order to increase spot property of AF. AF areas AFE1 are densely (in high density) arranged by the concentrated arrangement described above.

In the determination processing in Step ST3, if regions of only image plane AF areas exist (for example, in the case of the setting area AR3 illustrated in FIG. 15), processing proceeds to Step ST5.

In Step ST5, processing for determining parts overlapping between dedicated AF areas and image plane AF areas is carried out. Then, processing proceeds to Step ST6.

In Step ST6, in accordance with the processing results in Step ST5, the setting area AR3 is divided into an area not overlapping between image plane AF areas and dedicated AF areas (for example, the setting area AR3*a* illustrated in FIG. 15) and an area overlapping therebetween (for example, the setting area AR3*b* illustrated in FIG. 15). Then, processing proceeds to Step ST7.

In Step ST7, it is determined whether dedicated AF areas exist in the divided areas. If dedicated AF areas do not exist in the divided areas, processing proceeds to Step ST8. In Step ST8, due to the existence of only image plane AF areas in the setting area AR3*a*, processing (arrangement) similar to Step ST2 is carried out.

In the determination processing in Step ST7, if dedicated AF areas exist in the divided areas, processing proceeds to Step ST9. In Step ST9, due to the existence of dedicated AF areas in the setting area AR3*b*, processing (arrangement) similar to Step ST4 is carried out.

The adjustment of the AF areas described above is summarized as follows.

The focus detection control unit 341 arranges, depending on whether dedicated AF areas exist in a setting area in the photographing range 50, image plane AF areas in an area where dedicated AF areas exist differently from image plane AF areas in an area where dedicated AF areas do not exist.

For example, AF areas AFE1 in a small frame size and AF areas AFE2 in a large frame size are prepared, and the number of AF areas AFE2 in an area where dedicated AF areas do not exist is set more than the number of AF areas AFE2 where dedicated AF areas exist.

In another respect, types of image plane AF areas change depending on whether dedicated AF areas exist in a setting area. For example, there are two types of image plane AF areas in the setting area AR1 illustrated in FIG. 13, whereas there is less or one type of image plane AF areas in the setting area AR2 illustrated in FIG. 14. Furthermore, in yet another respect, depending on whether dedicated AF areas exist in a setting area, a ratio between AF areas AFE1 and AFE2 may be changed. The ratio can be defined by, for example, either one of the number of each AF area and the size thereof in a setting area, the number of phase difference detection pixels included in each AF area, and a ratio in size between AF areas AFE1 and AFE2, or by combination thereof.

Furthermore, in still another respect, in a case where dedicated AF areas do not exist in a setting area, it is only necessary that image plane AF areas larger than a predetermined frame size (for example, AF areas AFE2) be set.

[Selection Processing]

Next, processing for selecting a defocus amount obtained in AF areas in each setting area will be described. A series of defocus amount selection processing described below is carried out by the DF amount selection unit 342. Firstly, a case where a setting area includes only image plane AF areas (for example, the case of the setting area AR1 mentioned above) will be described.

Figure 17:
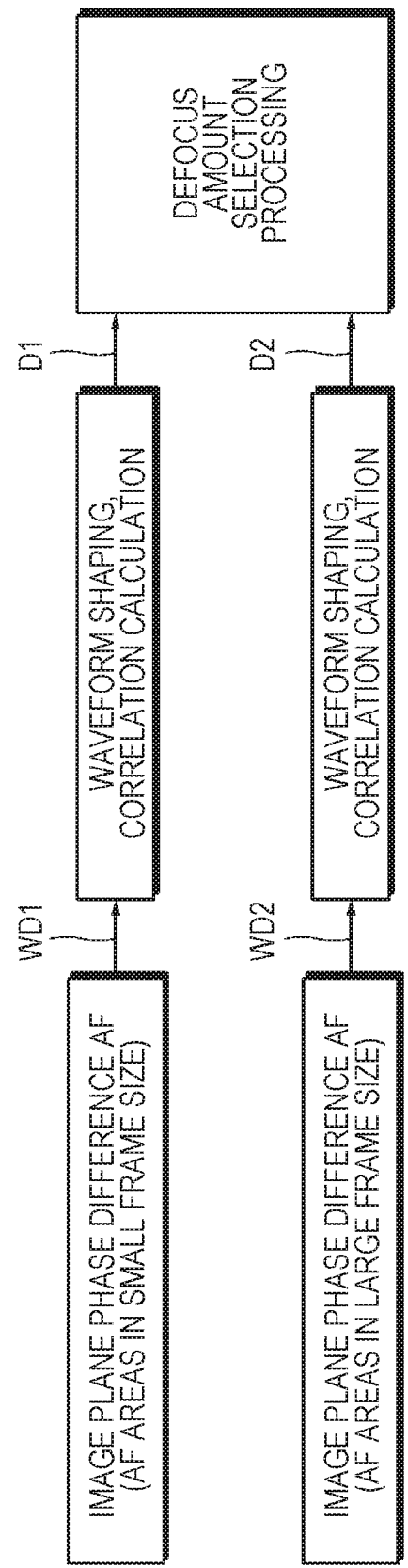
FIG. 17 is a diagram for describing defocus amount selection processing.

FIG. 17 is a diagram for describing defocus amount selection processing carried out in a case where a setting area is the setting area AR1. For example, waveform data WD1 are output from phase difference detection pixels included in AF areas AFE1 in a small frame size. Then, the waveform data WD1 are subjected to, for example, processing for waveform shaping and correlation calculation by the DF amount selection unit 342, and DF data D1 that indicate a defocus amount are output (e.g., a first defocus amount).

On the other hand, waveform data WD2 are output from phase difference detection pixels included in AF areas AFE2 in a large frame size. Then, the waveform data WD2 are subjected to, for example, processing for waveform shaping and correlation calculation by the DF amount selection unit 342, and DF data D2 that indicate a defocus amount are output (e.g., a second defocus amount).

The DF amount selection unit 342 evaluates reliability of each of the DF data D1 and D2, and selects the DF data D1 or D2 in accordance with the results. For example, in a case where DF data are larger than a threshold, reliability thereof is determined to be low, while in a case where DF data are smaller than a threshold, reliability thereof is determined to be high. This reliability may be calculated as an evaluation value through predetermined calculation. DF data selected by the DF amount selection unit 342 are supplied to the AF control unit 34B, which then carries out AF control.

Figure 18:
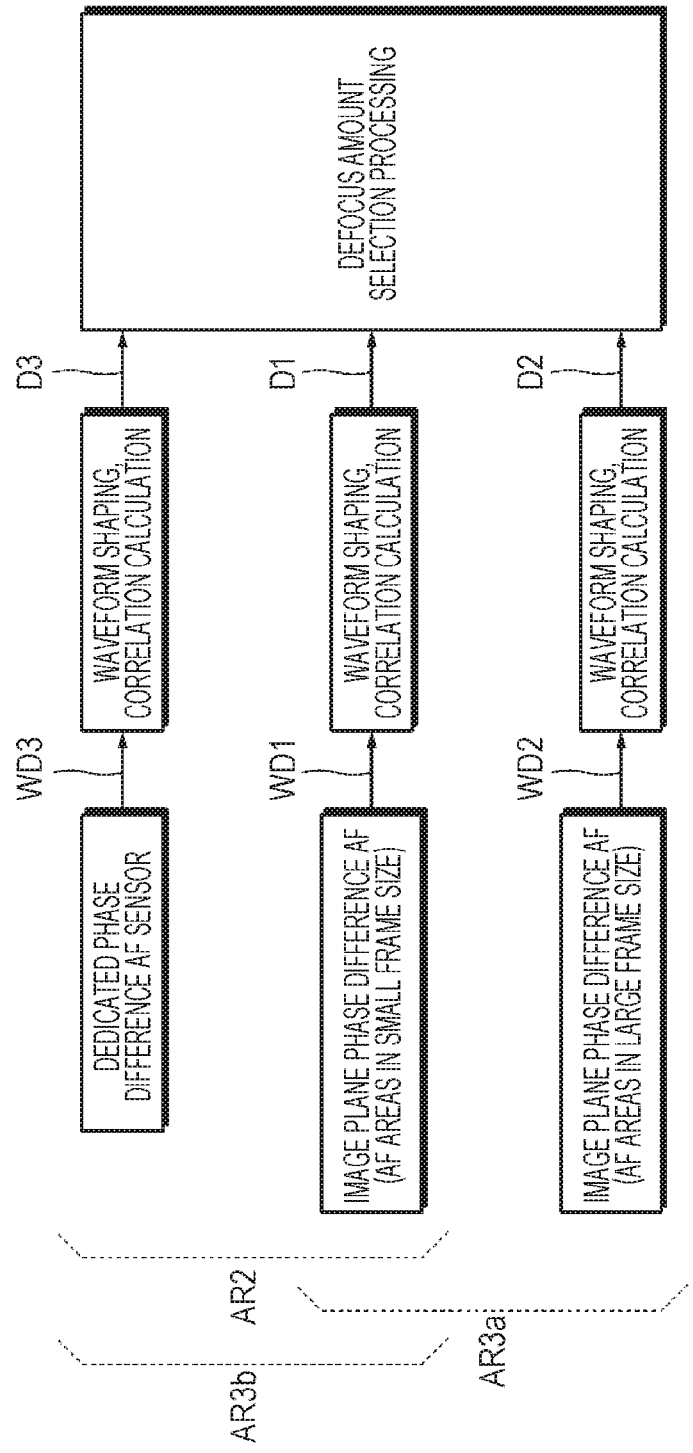
FIG. 18 is a diagram for describing defocus amount selection processing.

Next, a case where dedicated AF areas exist in a setting area (for example, the case of the setting area AR2 mentioned above) will be described. As illustrated in FIG. 18, waveform data WD3 are output from dedicated AF areas existing in the setting area AR2. Then, the waveform data WD3 are subjected to, for example, processing for waveform shaping and correlation calculation by the DF amount selection unit 342, and DF data D3 that indicate a defocus amount are output (e.g., a third defocus amount).

Here, in a case where reliability of the DF data D1 is low, for example, with an object largely blurred, the DF amount selection unit 342 selects the DF data D3 by determining accuracy thereof to be high. Then, the DF data D3 selected by the DF amount selection unit 342 are supplied to the AF control unit 34B, which then carries out AF control. However, in a case where reliability of the DF data D1 is high, the DF amount selection unit 342 selects the DF data D1 for reasons of, for example, improved AF accuracy for a small object. The DF data D1 selected by the DF amount selection unit 342 are supplied to the AF control unit 34B, which then carries out AF control.

Meanwhile, in a case where a setting area is the setting area AR3, each processing described above is carried out in accordance with the divided areas.

On the other hand, processing illustrated in FIGS. 17 and 18 may be carried out for all image plane AF areas and dedicated AF areas to select a defocus amount based on the results, or compare most favorable data with one another. In addition, areas in a small frame size and in a large frame size output from a sensor are both waveforms. However, in processing for calculating DF and reliability evaluation values for the number of areas in the focus detection control unit 341 to select DF data, it is possible to select areas not in perspective conflict by comparing a plurality of DF and reliability evaluation values. For example, it is assumed that a DF evaluation value of AF areas in a large frame size is unreliable at 0 μm, a DF evaluation value of AF areas 1 in a small frame size is highly reliable at 100 μm, and a DF evaluation value of AF areas 2 in a small frame size is highly reliable at −100 μm. In this case, it is determined that a perspective conflict has occurred within large frames, and AF areas in a small frame size on a near side are selected. This processing is similar in AF in an image phase difference system and in AF using a dedicated phase difference sensor.

2. Modification

However, the present disclosure can also adopt a following configuration.

(1)
An imaging control device including a focus detection control unit that differently sets, depending on whether ranging areas by a first phase difference detection sensor exist in a setting area set in a photographing range of an imaging unit, ranging areas by a second phase difference detection sensor in an imaging element.

(2)
The imaging control device according to (1), in which the focus detection control unit sets more types of the ranging areas in a case where the ranging areas by the first phase difference detection sensor do not exist in the setting area than in a case where the ranging areas by the first phase difference detection sensor exist in the setting area.

(3)
The imaging control device according to (1),
in which the ranging areas by the second phase difference detection sensor include at least
the first ranging areas, and
the second ranging areas larger than the first ranging areas, and
the focus detection control unit sets more second ranging areas in a case where the ranging areas by the first phase difference detection sensor do not exist in the setting area than in a case where the ranging areas by the first phase difference detection sensor exist in the setting area.

(4)
The imaging control device according to (3), in which the focus detection control unit changes a ratio between the first and second ranging areas depending on whether the ranging areas by the first phase difference detection sensor exist in the setting area.

(5)
The imaging control device according to (1), in which the focus detection control unit sets ranging areas by the second phase difference detection sensor larger than a predetermined size in a case where the ranging areas by the first phase difference detection sensor do not exist in the setting area.

(6)
The imaging control device according to (3) or (4), in which the first and second ranging areas overlap each other.

(7)
The imaging control device according to (3) or (4), in which the first and second ranging areas are independent from each other.

(8)
The imaging control device according to (1) to (7), in which the focus detection control unit changes, in a case where the ranging areas by the first phase difference detection sensor exist in the setting area, a size of the ranging areas.

(9)
The imaging control device according to (1) to (8) further including a defocus amount selection unit.

(10)
The imaging control device according to (9), in which the defocus amount selection unit selects in accordance with a predetermined condition, in a case where the ranging areas by the first phase difference detection sensor exist in the setting area, one defocus amount from among a defocus amount obtained by the first phase difference detection sensor, a defocus amount obtained by the second phase difference detection sensor corresponding to the first ranging areas, and a defocus amount obtained by the second phase difference detection sensor corresponding to the second ranging areas.

(11)
The imaging control device according to (9) or (10), in which the defocus amount selection unit selects in accordance with a predetermined condition, in a case where the ranging areas by the first phase difference detection sensor do not exist in the setting area, one defocus amount of a defocus amount obtained by the second phase difference detection sensor corresponding to the first ranging areas and a defocus amount obtained by the second phase difference detection sensor corresponding to the second ranging areas.

(12)

The imaging control device according to (1) to (11), in which the setting area is an area set in response to an input operation by a user.

(13)

The imaging control device according to (1) to (11), in which the setting area is an area set in accordance with a result of object detection processing.

(14)

The imaging control device according to (1) to (12), in which signals are read only from the second phase difference detection sensors in the setting area, of the second phase difference detection sensors in the photographing range.

(15)

The imaging control device according to (1) to (13), in which the first phase difference detection sensor is set in a place different from the imaging element.

(16)

The imaging control device according to (1) to (15) including the imaging unit, the first phase difference detection sensor, and the second phase difference detection sensor.

(17)

An imaging control method, in which a focus detection control unit differently sets, depending on whether ranging areas by a first phase difference detection sensor exist in a setting area set in a photographing range of an imaging unit, ranging areas by a second phase difference detection sensor in an imaging element.

Frame sizes of image plane AF areas are not limited to two and may be three or more. For example, there may be three frame sizes, large, medium, and small. Besides, for example, in a case where a setting area includes only image plane AF areas, image plane AF areas in three frame sizes are arranged, and in a case where dedicated AF areas exist in a setting area, image plane AF areas in two frame sizes, medium and small, may be arranged. Furthermore, a shape of an AF frame for AF calculation or as UI is not limited to a rectangle, and may be any shape such as circle, ellipse, and polygon.

A frame size of dedicated AF areas may be changed. For example, the frame size of dedicated AF areas can be changed by changing unit of reading pixels of a dedicated phase difference AF sensor 13 (calculation unit).

It is possible to readjust AF areas in accordance with a defocus amount. For example, in a case where a DF data value is small, it is possible to reduce the frame size of the AF areas by the dedicated phase difference AF sensor 13 (AF areas by an image plane AF sensor 12B are also acceptable) to increase spot property.

A semi-transmissive mirror 11 and/or the dedicated phase difference AF sensor 13 may not be included in a body 10 of an imaging device 1, but attachably and detachably included in a body 10 (for example, an adapter for mounting a various types of lenses), and may be located in any place different from an imaging element 12A. The dedicated phase difference AF sensor 13 may also be provided in a lower portion of the body 10.

The dedicated phase difference AF sensor 13 may not be a line sensor, but a cross sensor where two pairs of AF sensors (line sensors) are arranged in a cross shape. In addition, the image plane AF sensor 12B may be a sensor in a vertical direction capable of detecting horizontal patterns. Furthermore, a sensor capable of detecting vertical and horizontal patterns may be mixed as the image plane AF sensor 12B. In a case where a setting area includes only image plane AF areas, it is possible to set AF areas so as to include an image plane AF sensor 12B capable of detecting vertical patterns besides one capable of detecting horizontal patterns to make it possible to detect patterns in both directions.

An embodiment and the like of the present disclosure have been specifically described above, but the present disclosure is not limited thereto, and various types of modifications based on technical ideas of the present disclosure may be made. For example, configurations, methods, processes, shapes, materials, and numerical values presented in the above embodiment are only examples, and configurations, methods, processes, shapes, materials, and numerical values different therefrom may be used as needed. Configurations for realizing the embodiment and modification described above may be added appropriately.

The imaging device in the embodiment may be incorporated in medical devices such as microscopes, smartphones, computer devices, game machines, robots, security cameras, and moving bodies (such as vehicles, trains, airplanes, helicopters, small air vehicles, construction vehicles, and agricultural vehicles).

Each unit included in the imaging device needs not be integrally included as an imaging device, but a part of each configuration may be an independent device. For example, it is possible to realize the present disclosure as a single imaging control device. For example, it is also possible that a display unit is an independent device as a display device. In addition, the imaging device 1 may be included an imaging control device. For example, an imaging control device may include an imaging unit, an image plane AF sensor 12B, and a dedicated phase difference AF sensor 13. Control commands and data in each device are transferred through wire or wireless communication. Thus, the present disclosure can be realized as an imaging system including a plurality of devices, as well as by, for example, methods and programs.

REFERENCE SIGNS LIST

1 Imaging device
12A Imaging element
12B Image plane AF sensor
13 Dedicated phase difference AF sensor
20 Optical imaging system
34A Imaging control device
341 Focus detection control unit
342 DF amount selection unit
AR Setting area

The invention claimed is:

1. An imaging control device comprising:
a focus detection control circuitry configured to
determine whether a setting area includes a portion of a dedicated phase difference detection sensor, the setting area being in a photographing range of an imaging unit,
responsive to determining that the setting area does not include the portion of the dedicated phase difference detection sensor, set one or more ranging areas of an image plane phase difference detection sensor to one or more first ranging areas, and wherein the focus detection control circuitry is further configured to set different types of the one or more first ranging areas.

2. The imaging control device according to claim 1, wherein the different types of the one or more first ranging areas include at least
a first type, and
a second type that is larger than the first type, and
wherein the focus detection control circuitry is further configured to set more of the second type than the first type.

3. The imaging control device according to claim 2, wherein the different types of the one or more first ranging areas overlap each other.

4. The imaging control device according to claim 2, wherein the different types of the one or more first ranging areas are independent from each other.

5. The imaging control device according to claim 1, further comprising a defocus amount selection circuitry configured to select one defocus amount from among
a first defocus amount obtained by the image plane phase difference detection sensor corresponding to a first type the one or more first ranging areas, and
a second defocus amount obtained by the image plane phase difference detection sensor corresponding to a second type of the one or more first ranging areas,
wherein the selection of the one defocus amount is based on a predetermined condition.

6. The imaging control device according to claim 1, wherein responsive to determining that the setting area includes the portion of the dedicated phase difference detection sensor, the focus detection control circuitry is further configured to set the one or more ranging areas of the image plane phase difference detection sensor to one or more second ranging areas.

7. The imaging control device according to claim 6, wherein the one or more second ranging areas are different than the one or more first ranging areas.

8. The imaging control device according to claim 7, wherein a density of first image plane phase detection areas of the one or more first ranging areas is different than a density of second image plane phase detection areas of the one or more second ranging areas.

9. The imaging control device according to claim 7, wherein a number of first image plane phase detection areas of the one or more first ranging areas is different than a number of second image plane phase detection areas of the one or more second ranging areas.

10. The imaging control device according to claim 7, wherein a size of the one or more first ranging areas is smaller than a size of the one or more second ranging areas.

11. The imaging control device according to claim 6, wherein the focus detection control circuitry is further configured to determine a focus setting, and wherein a size of the one or more first ranging areas and a size of the one or more second ranging areas are based on the focus setting that is determined.

12. The imaging control device according to claim 6, further comprising a defocus amount selection circuitry configured to select one defocus amount from among
a second defocus amount obtained by the image plane phase difference detection sensor corresponding to the one or more second ranging areas, and
a third defocus amount obtained by the dedicated phase difference detection sensor, wherein the selection of the one defocus amount is based on a predetermined condition.

13. The imaging control device according to claim 1, wherein the setting area is an area set in response to an input operation by a user.

14. The imaging control device according to claim 1, further comprising an object detection processing circuitry, wherein the setting area is an area set based on a result from the object detection processing circuitry.

15. The imaging control device according to claim 1, wherein signals are read only from the one or more first ranging areas in the setting area and in the photographing range.

16. The imaging control device according to claim 1, wherein the dedicated phase difference detection sensor is set in a place different from an imaging element.

17. The imaging control device according to claim 1, further comprising:
the imaging unit;
the dedicated phase difference detection sensor; and
the image plane phase difference detection sensor.

18. An imaging control method, the method comprising:
determining whether a setting area includes a portion of a dedicated phase difference detection sensor, the setting area being in a photographing range of an imaging unit; and
setting, with a focus detection control circuitry, a plurality of ranging areas of an image plane phase difference detection sensor to a plurality of first ranging areas in response to determining that the setting area does not include the portion of the dedicated phase difference detection sensor,
wherein the plurality of first ranging areas includes different types of ranging areas of the image plane phase difference detection sensor.

19. The imaging control method according to claim 18, further comprising: setting, with the focus detection control circuitry, the plurality of ranging areas of the image plane phase difference detection sensor to a plurality of second ranging areas in response to determining that the setting area does include the portion of the dedicated phase difference detection sensor, wherein the plurality of second ranging areas are a single type of ranging area of the image plane phase difference detection sensor.

20. An imaging apparatus comprising:
a dedicated phase difference detection sensor;
an image plane phase difference detection sensor; and
a focus detection control circuitry configured to
determine whether a setting area includes a portion of the dedicated phase difference detection sensor, the setting area being in a photographing range of an imaging unit, and
responsive to determining that the setting area does not include the portion of the dedicated phase difference detection sensor, set one or more ranging areas of the image plane phase difference detection sensor to one or more first ranging areas,
wherein the focus detection control circuitry is further configured to set different types of the one or more first ranging areas.

* * * * *